US007546197B2

(12) United States Patent
Masuda et al.

(10) Patent No.: US 7,546,197 B2

(45) Date of Patent: *Jun. 9, 2009

(54) DRIVING FORCE CONTROL DEVICE OF VEHICLE

(75) Inventors: Toshio Masuda, Tokyo (JP); Kenichi Yamamoto, Tokyo (JP); Kenji Hijikata, Tokyo (JP); Satoshi Satomura, Tokyo (JP); Atsushi Atake, Tokyo (JP); Kouji Kaneda, Tokyo (JP); Tatsuru Fukuda, Tokyo (JP); Minoru Yuki, Tokyo (JP); Masayuki Ushiki, Tokyo (JP); Tsuyoshi Kobayashi, Tokyo (JP); Masahito Motoi, Tokyo (JP); Naoki Shibata, Tokyo (JP); Hiroshi Ogiwara, Tokyo (JP); Katsumasa Igarashi, Tokyo (JP); Junzo Shinozuka, Tokyo (JP); Akihisa Nakamura, Tokyo (JP)

(73) Assignee: Fuji Jukogyo Kabushiki Kaisha, Tokyo (JP)

( * ) Notice: Subject to any disclaimer, the term of this patent is extended or adjusted under 35 U.S.C. 154(b) by 110 days.

This patent is subject to a terminal disclaimer.

(21) Appl. No.: 11/783,266

(22) Filed: Apr. 6, 2007

(65) Prior Publication Data

US 2007/0255462 A1 Nov. 1, 2007

(30) Foreign Application Priority Data

Apr. 7, 2006 (JP) ............................. 2006-106146
Jul. 31, 2006 (JP) ............................. 2006-209040

(51) Int. Cl.
*G06F 19/00* (2006.01)

(52) U.S. Cl. .......................... 701/55; 701/101; 701/110

(58) Field of Classification Search .................. 701/55, 701/99, 101, 110, 111–113, 115, 116
See application file for complete search history.

(56) References Cited

U.S. PATENT DOCUMENTS 7,424,361 B2 * 9/2008 Masuda et al. .............. 701/101

FOREIGN PATENT DOCUMENTS

JP 2005-188384 7/2005

* cited by examiner

*Primary Examiner*—Gertrude Arthur Jeanglaud
(74) *Attorney, Agent, or Firm*—McGinn IP Law Group, PLLC

(57) ABSTRACT

A driving force control device can set driving force characteristics which conform to tastes of drivers using one vehicle thus giving the easy-to-drive feeling to the drivers. An $E/G_{13}ECU$ possesses three modes 1 to 3 as control modes and selects one mode from these modes based on a manipulation input using a mode selection switch. Further, any one of the mode out of these modes 1 to 3 is preset in the $E/G_{13}ECU$ as a temporary changeover mode, and the $E/G_{13}ECU$ changes over a mode selected by the mode selection switch and the preset temporary changeover mode alternatively by the temporary changeover switch.

7 Claims, 15 Drawing Sheets

DRIVING FORCE CONTROL DEVICE OF VEHICLE

CROSS-REFERENCE TO RELATED APPLICATIONS

The disclosures of Japanese Application NO. 2006-106146 filed on Apr. 7, 2006 and No. 2006-209040 filed on Jul. 31, 2006 including the specification, drawings and abstract is incorporated herein by reference in its entirety.

BACKGROUND OF THE INVENTION

1. Field of the Invention

The present invention relates to a driving force control device of a vehicle in which one driving force characteristic is selected out of a plurality of different driving force characteristics by an external manipulation to control a driving force in accordance with the selected driving force characteristic.

2. Description of the Related Art

Conventionally, in an engine with a so-called electronically controlled throttle in which a throttle valve is electronically controlled using a throttle actuator, an accelerator pedal and the throttle valve are not mechanically linked and hence, opening degree of the throttle valve (throttle opening degree) can be controlled with nonlinear characteristic with respect to an operation amount of the accelerator pedal (accelerator opening degree).

For example, publication of unexamined patent application JP A 2005-188384 discloses a technology in which an operation state of an engine is divided into a plurality of operation regions based on an engine rotational speed and accelerator opening degree and a map is set for each operation region to perform control of the throttle valve conforming to the operation state of the engine.

According to the technology disclosed in this document, a favorable operation performance is achieved by allowing the engine to exhibit the maximum potential during high-speed traveling, while a favorable driveability is achieved by operating the engine with the suppressed power when stopping and starting are repeated as in the case of a traffic jam.

SUMMARY OF THE INVENTION

However, in the technology disclosed in the above-mentioned document, a map is automatically selected in response to each driving region and throttle opening degree is controlled based on the selected map. Accordingly, for example, in a state that a vehicle with a high-performance engine such as a turbo engine travels on a general road, when a driver fully steps on an accelerator pedal, a driving region becomes a full acceleration region thus generating powerful acceleration performance. Accordingly, when the vehicle travels on the general road, the driver needs to always finely adjust an operation amount of the accelerator pedal and hence, which makes the driver nervous with an acceleration work.

On the other hand, when the power of the engine is excessively suppressed more than necessity, in the high-speed traveling and the hill-climbing traveling, a vehicle cannot exhibit the sufficient acceleration performance thus imparting power shortage feeling to the driver.

Further, a driver who prefers the fuel-efficient driving with suppressed power and a driver who prefers the sharp driving with the excellent acceleration/deceleration response respectively demand the different driving force characteristics of the vehicle. Accordingly, when the drivers who differ in driving tastes respectively drive one single vehicle, it is difficult to achieve a driving force control which satisfies the demands of the respective drivers.

In general, a user purchases a vehicle having a driving force characteristic which conforms to a taste of the driver. Accordingly, when the user selects a vehicle which exhibits the powerful driving force characteristic, the fuel efficiency is sacrificed. On the other hand, when the user selects a vehicle which exhibits the driving force characteristic of good fuel efficiency, the powerfulness is sacrificed. In this manner, there exists a difficulty to satisfy both of the driving force characteristic of good fuel efficiency and the powerfulness thus deteriorating the easy-to-drive property.

Further, there may be a case that the driver who prefers the fuel-efficient driving with suppressed power needs to pass a car on a highway, for example. In such a case, the powerful driving force characteristic may be needed temporarily. To the contrary, there may be a case that the driver who prefers sharp driving with the excellent acceleration/deceleration response needs to drive on a locally or partially wet or frozen road. In such a case, the driving force characteristic with suppressed power may be needed temporarily.

The present invention has been made under such circumstances and it is an object of the present invention to provide a driving force control device of a vehicle which can fulfill requirements of driving force characteristics by all drivers with one single vehicle, and can achieve not only fuel-efficient driving but also sharp driving thus realizing the easy-to-drive vehicle.

To achieve the above-mentioned object, there is provided a driving force control device of a vehicle of the present invention which includes: a mode selection control means provided to select one mode out of at least three modes which differ in driving force characteristics as a control mode based on an external manipulation; a temporary changeover mode setting means provided to set an arbitrary mode from the respective modes as an temporary changeover mode based on an external manipulation; a temporary changeover control means for changing over the mode selected by the mode selection control means and the temporary changeover mode set by the temporary changeover mode setting means alternately based on an external manipulation; and a driving force setting means for setting a driving force indication value based on a driving state from the driving force characteristic corresponding to the mode selected by the mode selection control means or the temporary changeover mode when temporary selected by the temporary changeover control means.

According to the present invention, a plurality of modes with different driving force characteristics can be set and one mode can be selected out of the plurality of modes by an external manipulation. Further, a mode can be temporarily changed over to a preset arbitrary mode as a temporary changeover mode and hence, the driving force characteristics which conform to tastes of drivers can be set with one vehicle thus realizing not only the fuel-efficient driving but also the sharp driving thus enhancing the easy-to-drive vehicle.

DESCRIPTION OF THE PREFERRED EMBODIMENTS

Figure 1:
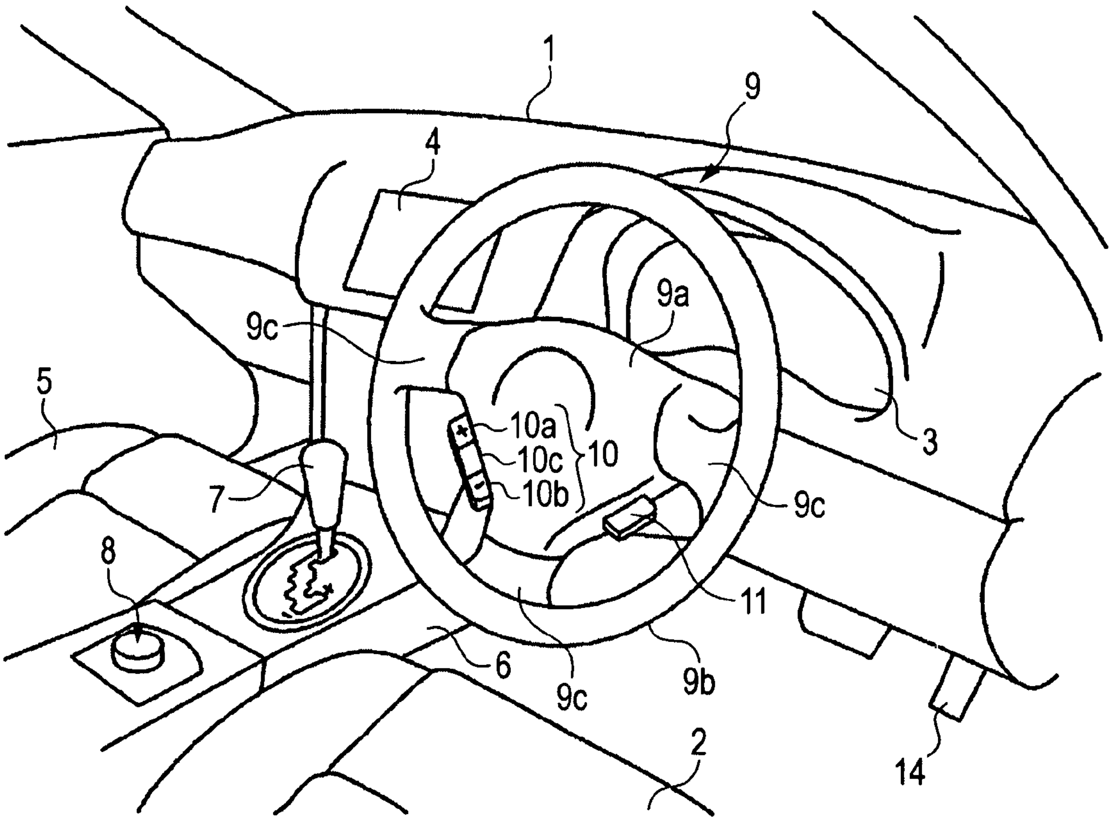
FIG. 1 is a perspective view of an instrument panel and a center console as viewed from a driver's seat side according to a first embodiment of the invention.

Hereinafter, a first embodiment of the present invention is explained in conjunction with drawings. FIG. 1 shows a perspective view of an instrument panel and a center console as viewed from a driver's seat side.

As shown in FIG. 1, the instrument panel 1 which is arranged in a front portion in the inside of a cabin of a vehicle extends laterally in the vehicle width direction, and a combination meter 3 is arranged on the instrument panel 1 which is positioned in front of a driver's seat 2. Further, at the substantially center of the instrument panel 1 in the vehicle width direction, a center display 4 which is used as a display means constituting a well-known car navigation system is arranged.

Further, on a center console 6 which is arranged between the driver's seat 2 and a passenger seat 5 and extends toward a rear side of a vehicle body from the instrument panel 1 side, a selection lever 7 which is used to select a range of an automatic transmission is arranged, and a mode selection switch 8 which is used as a selection means for selecting driving force characteristic of an engine is arranged behind the selection lever 7. Further, a steering wheel 9 is arranged in front of the driver's seat 2.

The steering wheel 9 includes a center pad portion 9*a* which houses an air bag or the like, and the center pad portion 9*a* and left, right and lower portions of a grip portion 9*b* which is arranged around the center pad portion 9*a* are connected with each other by way of 3 spokes 9*c*. A display changeover switch 10 which is used as a display changeover means is arranged on a left lower portion of the center pad portion 9*a*. Further, a temporarily changeover switch 11 which is used as a temporarily changeover means is arranged on a right lower portion of the center pad portion 9*a*.

Figure 2:
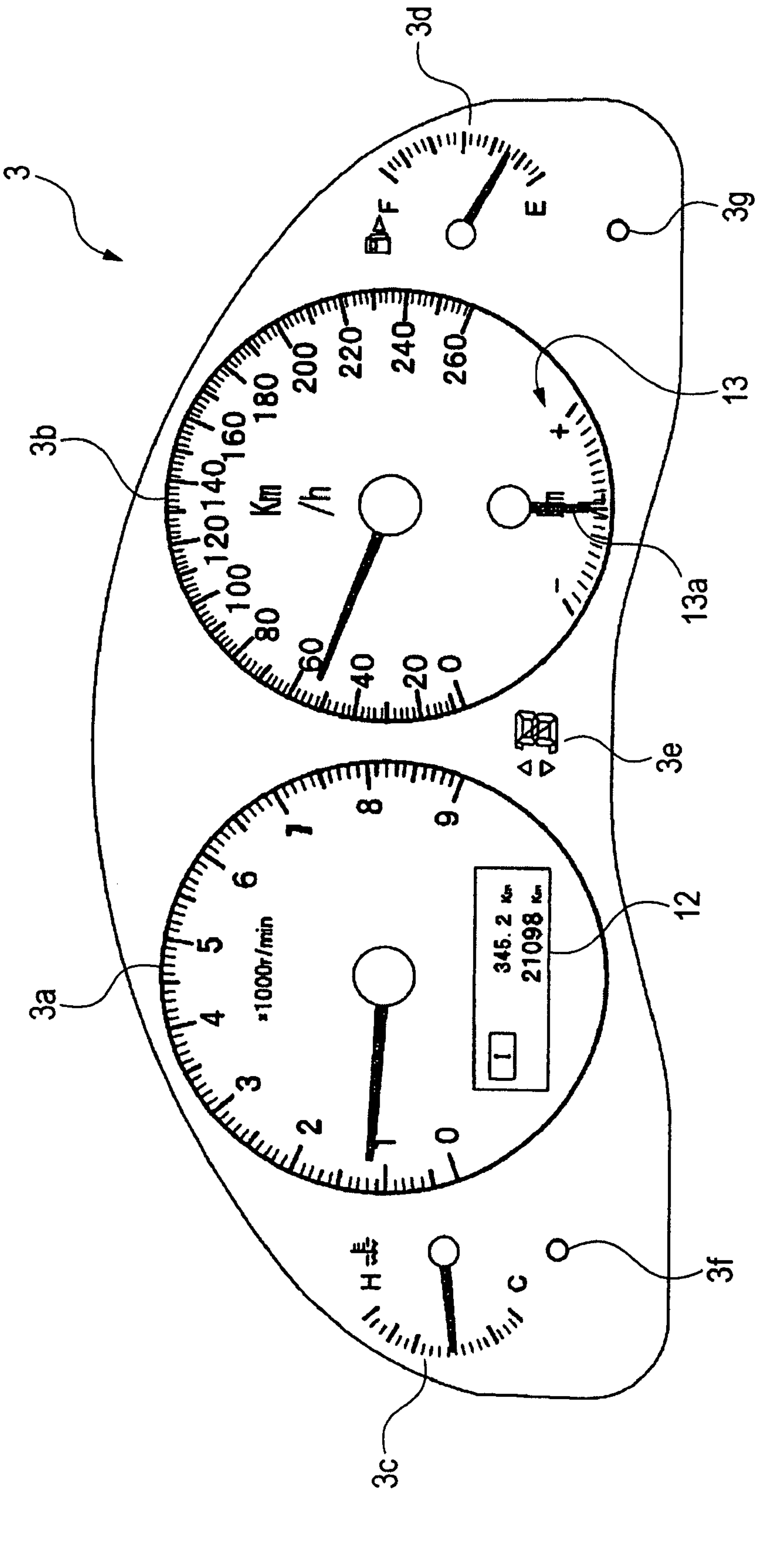
FIG. 2 is a front view of a combination meter according to the first embodiment.

Further, as shown in FIG. 2, on left and right sides of the combination meter 3 close to the center, a tachometer 3*a* which indicates an engine rotational speed and a speed meter 3*b* which indicates a vehicle speed are respectively arranged. Further, a water temperature meter 3*c* which indicates a cooling water temperature is arranged on the left side of the tachometer 3*a*, and a fuel level meter 3*d* which indicates residual fuel quantity is arranged on the right side of the speed meter 3*b*. Further, a gearshift position display portion 3*e* which indicates a current position of gearshift is arranged on a center portion of the combination meter 3. Here, symbol 3*f* indicates a warning lamp, and symbol 3*g* indicates a trip reset switch which resets a trip meter. A push button of the trip reset switch 3*g* projects toward the driver's seat 2 side from the combination meter 3, and the trip meter is reset when the driver or the like continuously turns on the trip reset switch 3*g* for a predetermined time or more by pushing the push button.

Further, on a lower portion of the tachometer 3*a*, a multi information display (hereinafter, abbreviated as "MID") 12 which is used as a display means for respectively displaying information such as mileage, fuel consumption, the engine driving force by changing over a plurality of display images is arranged. Further, on a lower portion of the speed meter 3*b*, a fuel consumption meter 13 which indicates a state of fuel efficiency based on the difference between the instantaneous fuel consumption and the trip average fuel consumption is arranged.

Figure 3:
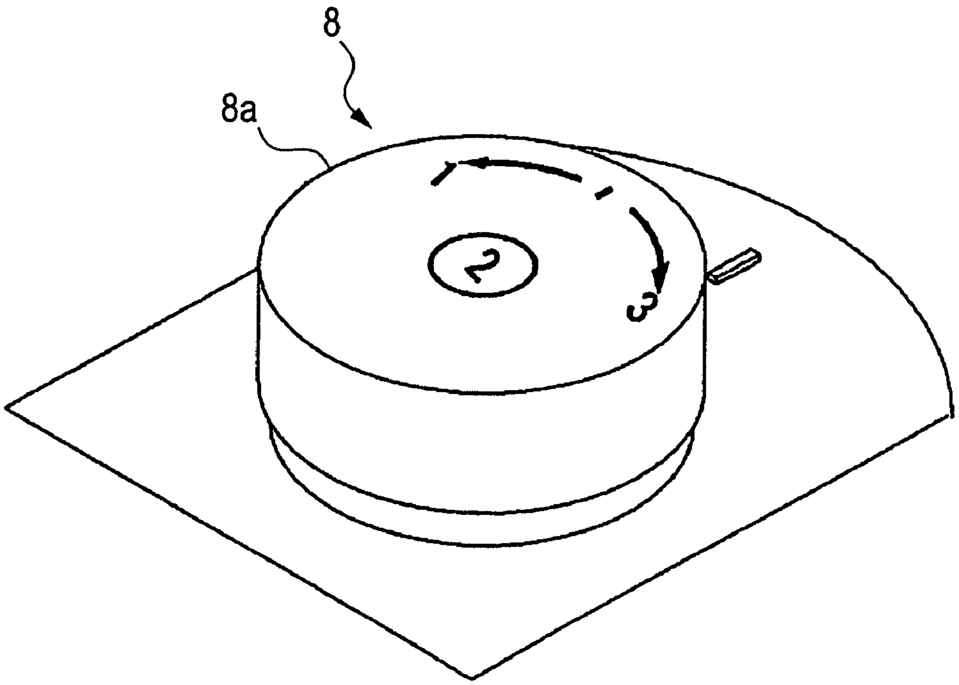
FIG. 3 is a perspective view of a mode selection switch according to the first embodiment.

Further, as shown in FIG. 3, the mode selection switch 8 is a shuttle switch which arranges a push switch parallel thereto. When an operator (since the operator is generally the driver, the explanation is made by referring the operator as "driver" hereinafter) manipulates a manipulation knob 8*a*, the driver can select three kinds of modes described later (a normal mode 1 which is a first mode, a save mode 2 which is a second mode, and a power mode 3 which is a third mode). That is, in this embodiment, by rotating the manipulation knob 8*a* in the left direction, a left switch is turned on and the normal mode is selected. By rotating the manipulation knob 8*a* in the right direction, a right switch is turned on and the power mode 3 is selected. On the other hand, by pushing the manipulation knob 8*a* in the lower direction, the push switch is turned on and the save mode 2 is selected. Here, by allocating the save mode 2 to the push switch, even when the push switch is turned on erroneously during traveling, for example, the mode is just changed over to the save mode 2 where an output torque is suppressed as described later, hence there is no possibility that the driving force is acutely increased thus ensuring the safe driving of the driver.

Here, output characteristics of the respective modes 1 to 3 are briefly explained. The normal mode 1 is set such that an output torque is changed approximately linearly with respect to a operation amount of the accelerator pedal 14 (accelerator opening degree) (see FIG. 11A). The normal mode 1 is a mode which is suitable for normal driving.

Further, the save mode 2 is set as a mode in which by saving an engine torque alone or by saving an engine torque in synchronism with a lock-up control in case of an automatic transmission, smooth output characteristic is obtained while ensuring a sufficient output thus allowing a driver to enjoy the acceleration work. Further, in the save mode 2, the output torque is suppressed and hence, it is possible to achieve both of the easy drive ability and low fuel consumption (fuel efficiency) in a well balanced manner. Further, for example, even in case of a vehicle with a 3 litter engine, the smooth output characteristic is obtained while ensuring a sufficient output corresponding to the 2 litter engine. Particularly, the easy-to-drive performance is achieved in a practical-use region such as traveling in towns.

The power mode 3 is set as a mode in which the output characteristics with an excellent response from a low speed region to a high speed region of the engine is achieved and, at the same time, in case of an automatic transmission, a shift-up point is changed in accordance with engine torque, hence the vehicle can cope with a sporty or zippy driving on a winding load or the like. That is, in the power mode 3, the high response characteristic is set with respect to the operation amount of the accelerator pedal 14 and hence, in case of a vehicle with a 3 litter engine, for example, a maximum torque is generated at a lower operation amount of the accelerator pedal 14 such that a potential of the 3 litter engine can be exercised at maximum. Here, driving force indication values (target torques) of the respective modes (normal mode 1, save mode 2, power mode 3) are, as described later, set based on 2 parameters consisting of an engine rotational speed and accelerator opening degree.

Figure 4:
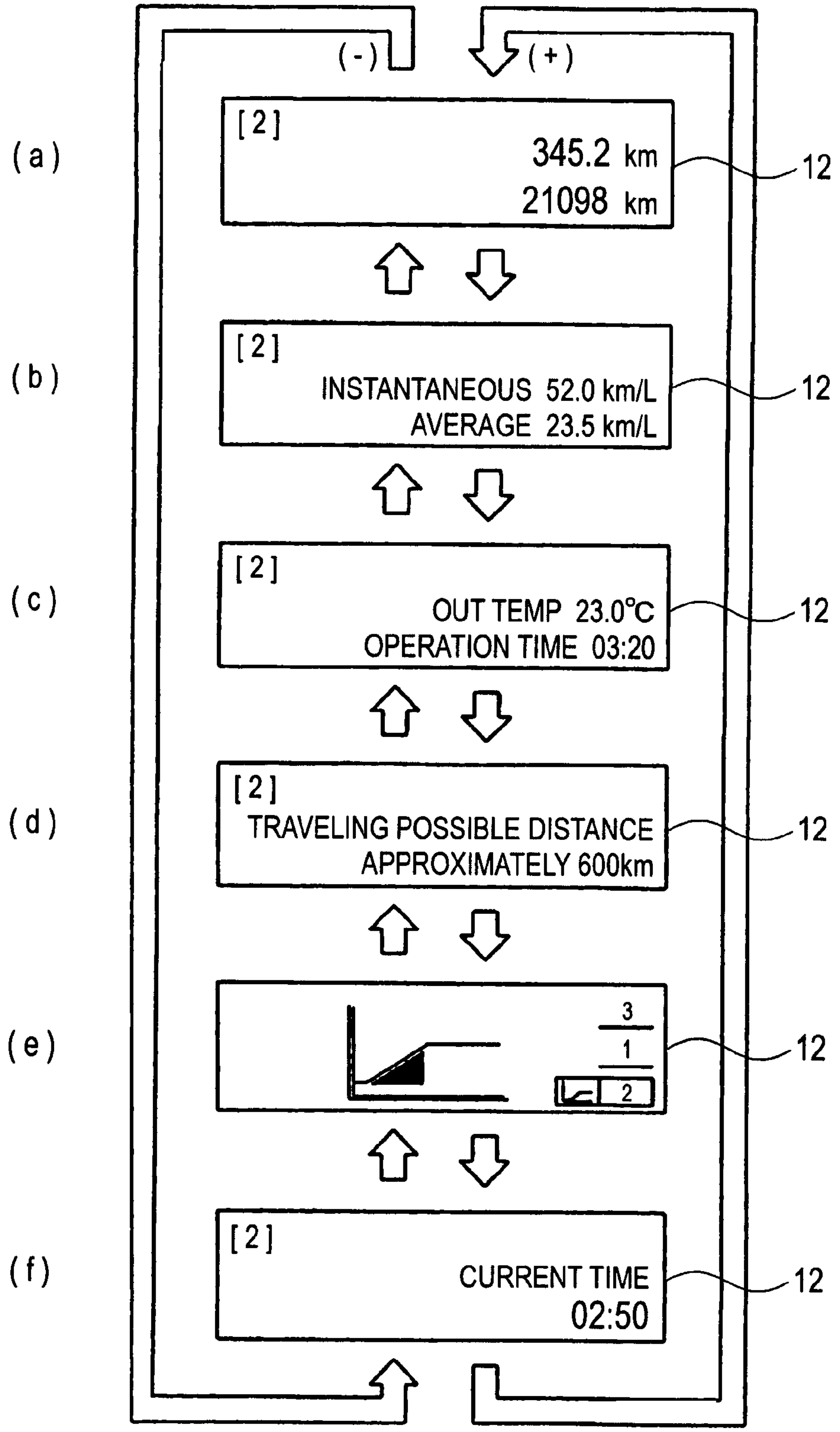
FIG. 4 is an explanatory view showing a display example of a multi-information display according to the first embodiment.

A display changeover switch 10 is manipulated to change over information displayed on a MID 12 and includes a forward feeding switch portion 10*a*, a reverse feeding switch portion 10*b*, and a reset switch portion 10*c*. FIG. 4 illustrates items for every images displayed on the MID 12 as an example. Here, the MID 12 may be a color display.

In this embodiment, 6 kinds of images (a) to (f) are set, wherein each time the forward feeding switch portion 10*a* is turned on, the images are changed over in order from (a) to (f). When the forward feeding switch portion 10*a* is turned on in a state that the image (f) is displayed, the initial image (a) is displayed. On the other hand, when the reverse feeding switch portion 10*b* is turned on, the image is changed over in the reverse direction.

The image (a) is an initial image which is displayed when the ignition switch is turned on. On the image (a), an odometer is displayed in a lower stage and a trip meter is displayed in an upper stage. Further, a current mode ("2" indicative of the save mode 2 in the drawing) is displayed at a left end of the image (a).

On the image (b), a mileage measured by the trip meter and a trip average fuel consumption [km/L] calculated based on a total fuel injection pulse width (pulse time) in the mileage are displayed in a lower stage, while a mileage during several seconds and an instantaneous fuel consumption [km/L] calculated based on the total fuel injection pulse width (pulse time) in the moment are displayed in an upper stage.

On the image (c), an operation time from a point of time that the engine is started is displayed in a lower stage and an outside temperature [° C.] is displayed in an upper stage.

On the image (d), an approximately traveling possible distance [Km] calculated based on residual fuel quantity in the inside of a fuel tank and the trip average fuel consumption is displayed.

On the image (e), an acceleration-torque line of the currently selected mode (the save mode 2 being indicated in the drawing) is displayed. In the acceleration-torque line, an output torque of the engine is taken on an axis of ordinates and the accelerator opening degree is taken on an axis of abscissas, and a power display region P is set in the inside of the displayed acceleration-torque line. In the power display region P, being interlocked with the increase or the decrease of the accelerator opening degree, the band showing the power level is linearly expanded or contracted in a transverse direction. Accordingly, by observing the displayed power level, the driver can easily grasp the current driving state.

The current time is displayed on the image (f).

Figure 5A:
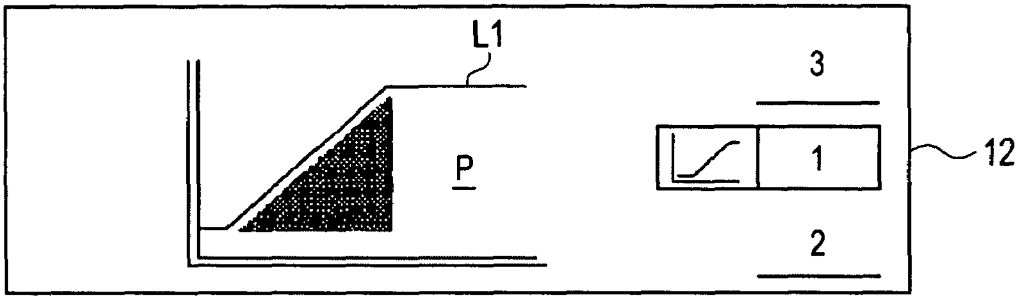
FIG. 5A to FIG. 5C are explanatory views showing a display example of the multi-information display at the time of changing over a mode according to the first embodiment.
Figure 5B:
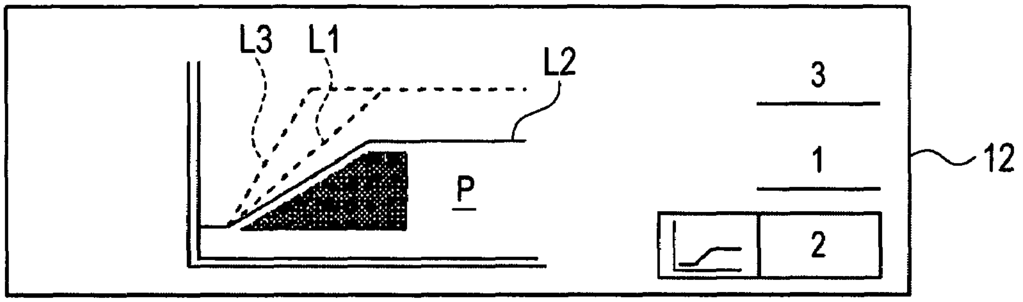
Figure 5C:
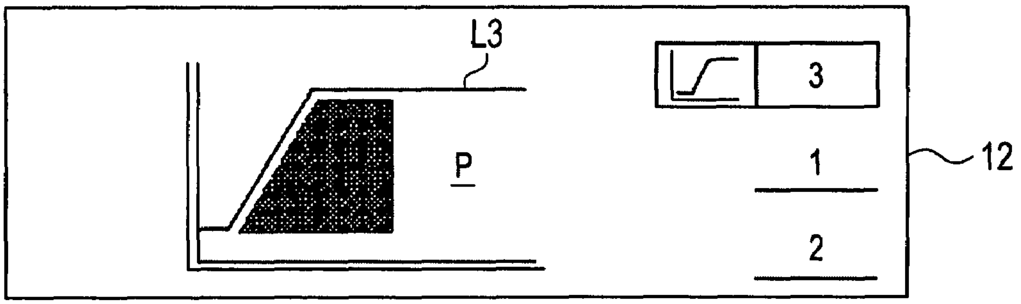

As shown in FIG. 5A to FIG. 5C, the above-mentioned acceleration-torque line displayed on the image (e) differs for every selected mode, that is, the normal mode 1, the save mode 2 or the power mode 3. FIG. 5A shows the acceleration-torque line L1 which constitutes a driving force characteristic line displayed when the normal mode 1 is selected. FIG. 5B shows the acceleration-torque line L2 which constitutes a driving force characteristic line displayed when the save mode 2 is selected. And FIG. 5C shows the acceleration-torque line L3 which constitutes a driving force characteristic line displayed when the power mode 3 is selected.

Here, the above-mentioned image (e) shown in FIG. 4 may be displayed on the MID 12 as an initial image when the ignition switch is turned on. In this case, immediately after the initial image is displayed, the respective acceleration-torque lines L1, L2, L3 are simultaneously displayed and, with a time delay, other acceleration-torque lines may be faded out while leaving only the acceleration-torque line corresponding to the currently set mode.

In FIG. 5B, to compare the driving force characteristics of the acceleration-torque lines L1, L2, L3 for respective modes, the acceleration-torque lines L1, L3 are indicated by a broken line in an overlapped manner. Here, these acceleration-torque lines L1, L3 are indicated for the conveniences sake and are not displayed in an actual operation. As shown in FIG. 5B, the power mode 3 possesses the characteristic which exhibits a larger throttle change quantity in response to a step-on operation of the accelerator pedal. Here, a larger target torque is set with respect to the accelerator opening degree. The normal mode 1 is set to possess the characteristic where the throttle opening degree is linearly arranged with respect to the operation amount of the accelerator pedal. Compared to the driving force characteristic of the power mode 3, the normal mode 1 possesses the characteristic which exhibits the relatively small throttle change quantity in response to the step-on operation of the accelerator pedal. That is, the normal mode 1 is set to acquire the favorable driving performance in a usual driving region where the accelerator opening degree is relatively small.

Further, the save mode 2 is set such that the driver can enjoy the acceleration work with the smooth output characteristic while ensuring a sufficient output.

Here, the content displayed in FIG. 5A to FIG. 5C (the image shown in FIG. 4(*e*)) may be always displayed on an information display which is separately provided in the inside of the tachometer 3*a*. Alternatively, only the display content shown in FIG. 5A to FIG. 5C is displayed on the MID 12 and other display contents shown in FIG. 4 may be displayed on an information display which is additionally provided.

Further, in the fuel consumption meter 13, a neutral position indicates the trip average fuel consumption [Km/L]. When the instantaneous fuel consumption [Km/L] is higher than the trip average fuel consumption [Km/L], a pointer 13*a* is swung in the plus (+) direction in response to the deviation, while when the instantaneous fuel consumption [Km/L] is lower than the trip average fuel consumption [Km/L], the pointer 13*a* is swung in the minus (−) direction in response to the deviation.

Figure 6:
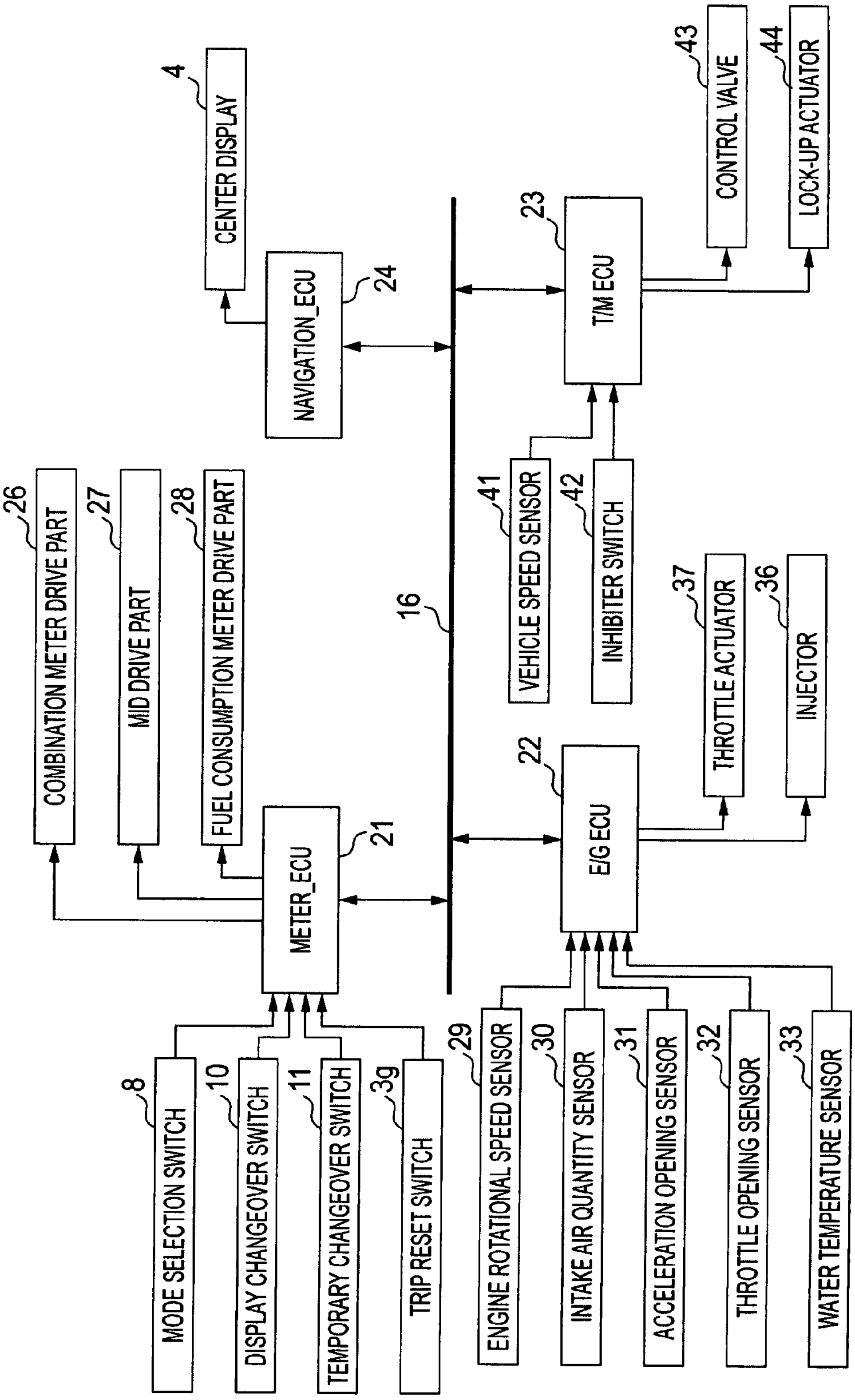
FIG. 6 is a constitutional view of a driving force control device according to the first embodiment.

Here, as shown in FIG. 6, to the vehicle, through an interior communication circuit 16 such as a CAN (Controller Area Network) communication, control devices which constitutes arithmetic operation means for controlling the vehicle such as a meter control device (meter_ECU) 21, an engine control device (E/G_ECU) 22, a transmission control device (T/M_ECU) 23, a navigation control device (navigation_ECU) 24 are connected in an intercommunicable manner.

Each one of the ECU 21 to 24 is mainly constituted of a computer such as a microcomputer and includes well-known CPU, ROM, RAM and a non-volatile memory means such as EEPROM.

The meter_ECU 21 is provided for controlling the whole display of the combination meter 3. Here, the mode selection switch 8, the display changeover switch 10, a temporary changeover switch 11 and the trip reset switch 3*g* are connected to an input side of the meter_ECU 21, while instruments such as the tachometer 3*a*, the speed meter 3*b*, the water temperature meter 3*c*, the fuel meter 3*d*, a combination meter drive part 26 which drives the warning lamp 3*f*, an MID drive part 27, and a fuel meter drive part 28 are connected to an output side of the meter_ECU 21.

The E/G_ECU 22 is provided for controlling an operation state of the engine. To an input side of the E/G_ECU 22, a group of sensors which detect the vehicle and engine operation states such as an engine rotational speed sensor 29 which constitutes an operation state detection means for detecting an engine rotational speed which is a typical example of parameters indicating the engine operation state based on a rotation of a crankshaft or the like, an intake air quantity sensor 30 which is arranged immediately downstream of an air cleaner or the like and detects the intake air quantity, an accelerator opening sensor 31 which constitutes an accelerator opening detection means for detecting accelerator opening degree of the accelerator pedal 14, a throttle opening sensor 32 which is interposed in an intake passage and detects opening degree of a throttle valve (not shown in the drawing) for adjusting an intake air quantity supplied to respective cylinders of the engine, a water temperature sensor 33 which constitutes an engine temperature detection means for detecting cooling water temperature indicative of an engine temperature are connected. Further, to an output side of the E/G_ECU 22, a group of actuators which controls the driving of the engine such as an injector 36 which injects a predetermined measured fuel to a combustion chamber, a throttle actuator 37 which is mounted in an electronically controlled throttle device (not shown in the drawing) are connected.

The E/G_ECU 22 sets fuel injection timing and a fuel injection pulse width (pulse time) with respect to the injector 36 based on inputted detection signals from the respective sensors. Further, E/G_ECU 22 outputs the throttle driving signal to the throttle actuator 37 which drives the throttle valve thus controlling the opening degree of the throttle valve.

Figure 11A:
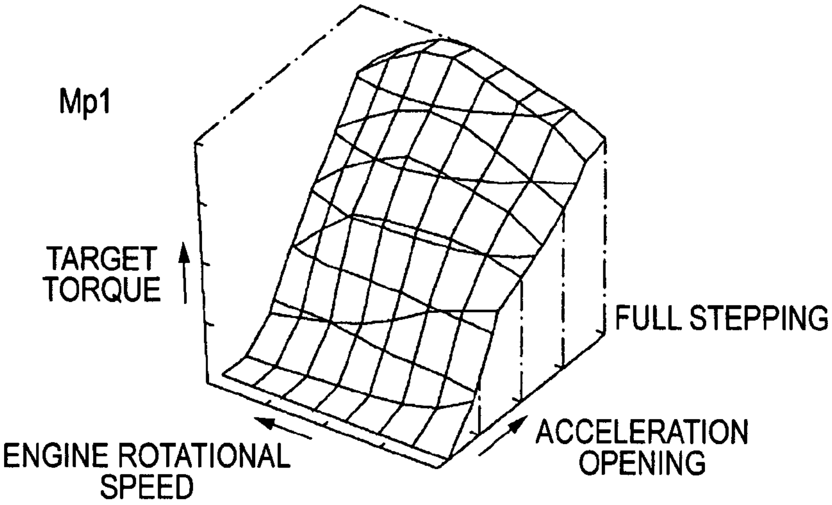
FIG. 11A is a conceptual view of a normal mode map according to the first embodiment.
Figure 11B:
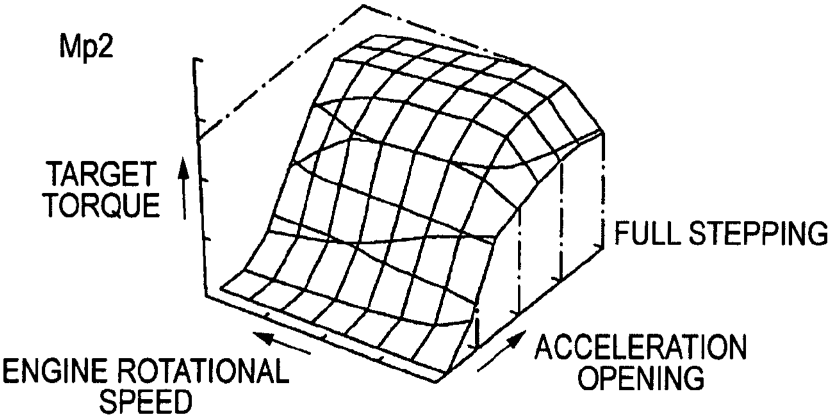
FIG. 11B is a conceptual view of a save mode map according to the first embodiment.
Figure 11C:
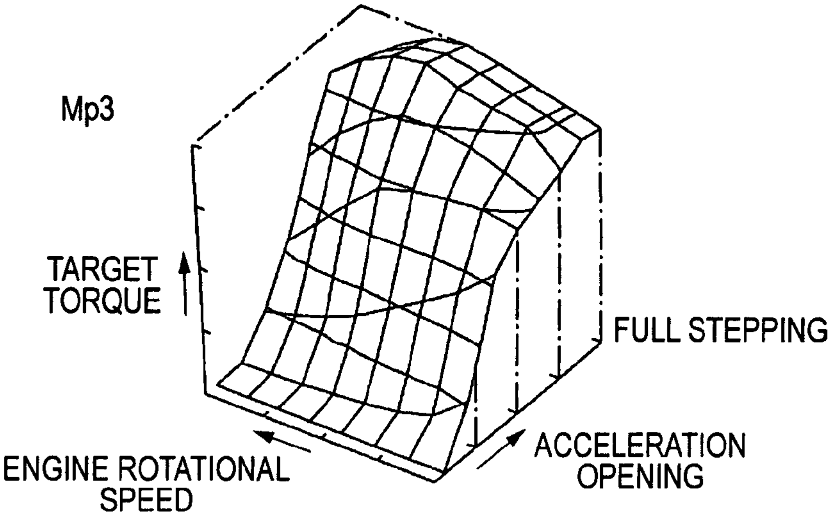
FIG. 11C is a conceptual view of a power mode map according to the first embodiment.
Figure 12:
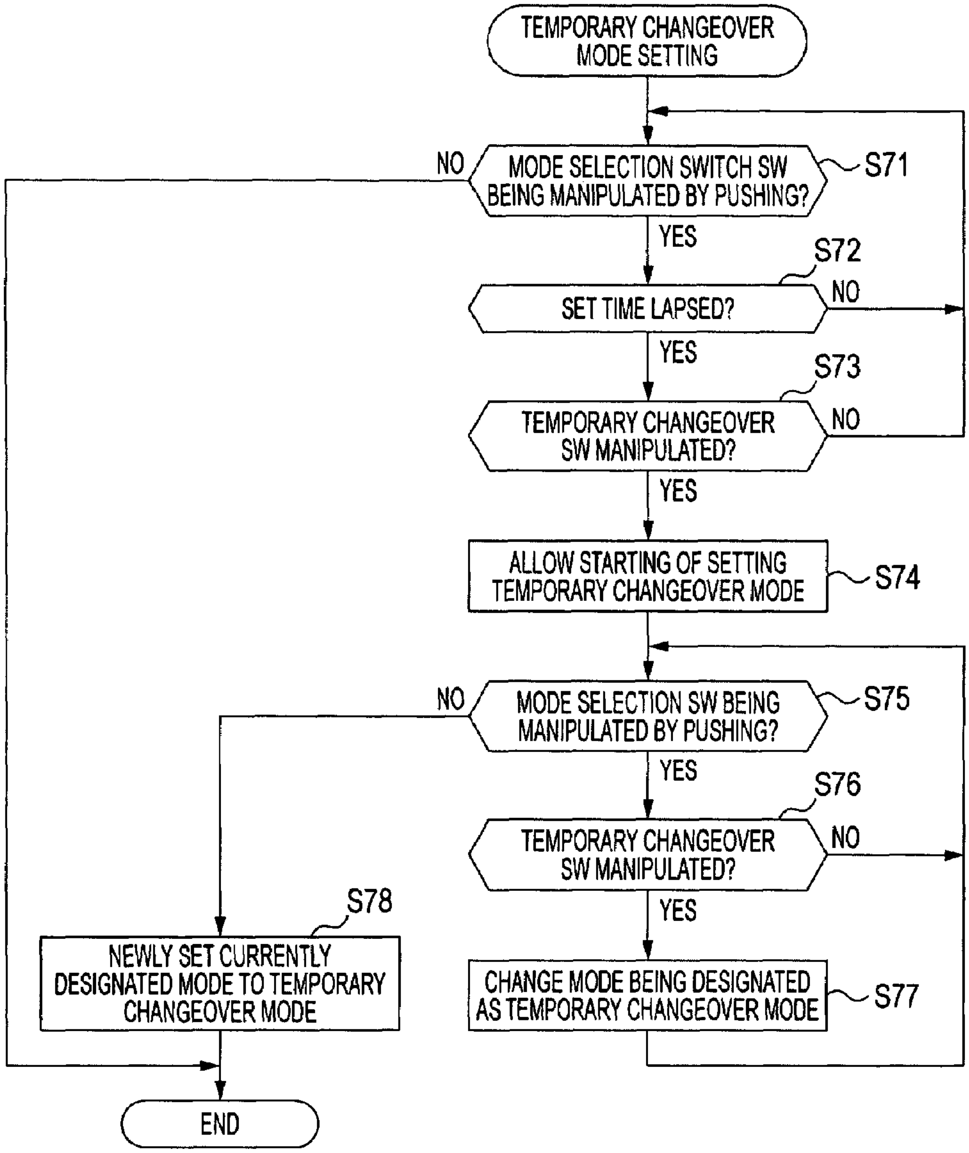
FIG. 12 is a flowchart showing a temporary changeover mode setting routine according to a second embodiment of the invention.

Here, in the volatile memory means which is provided to the E/G_ECU 22 and constitutes a portion of the driving force setting means, a plurality of different driving force characteristics is stored in a map form. As the respective driving force characteristics, in this embodiment, three kinds of mode maps Mp1, Mp2, Mp3 are provided. As shown in FIG. 11A to FIG. 11C, the respective mode maps Mp1, Mp2, Mp3 are configured as a three-dimensional map in which the accelerator opening degree and the engine rotational speed are taken on matrix axes, and driving force indication values (target torques) are stored in respective matrix points.

The respective mode maps Mp1, Mp2, Mp3 are basically selected by the manipulation of the mode selection switch 8. That is, when the normal mode 1 is selected by the mode selection switch 8, the normal mode map Mp1 which constitutes the first mode map is selected. When the save mode 2 is selected by the mode selection switch 8, the save mode map Mp2 which constitutes the second mode map is selected. Further, when the power mode 3 is selected by the mode selection switch 8, the power mode map Mp3 which constitutes the third mode map is selected.

Hereinafter, the driving force characteristics of the respective mode maps Mp1, Mp2, Mp3 are explained. The normal mode map Mp1 shown in FIG. 11A is set to exhibit the characteristic in which the target torque is linearly changed in a region where the accelerator opening degree is relatively small, and the maximum target torque is obtained when the opening degree of the throttle valve is close to a wide-open throttle.

Further, in the save mode map Mp2 shown in FIG. 11B, compared to the above-mentioned normal mode map Mp1, the elevation of the target torque is suppressed and hence, the driver can enjoy the acceleration work by widely using the stroke of the accelerator pedal 14. Further, since the elevation of the target torque is suppressed, it is possible to achieve both of the easy drive ability and the low fuel consumption in a well balanced manner. For example, in case of a vehicle with a 3 litter engine, the smooth output characteristic is obtained while ensuring a sufficient output corresponding to the 2 litter engine. Particularly, the target torque is set to achieve easy-to-drive performance in a practical-use region such as traveling in towns.

Further, in the power mode map Mp3 shown in FIG. 11C, a change rate of the target torque in response to the change of the accelerator opening degree is largely set in the substantially all driving region. Accordingly, for example, in case of a vehicle with a 3 litter engine, the target torque is arranged to maximize potential of the 3 litter engine. Here, the substantially same driving force characteristic is set in a low speed region including an idling rotational speed in the respective mode maps Mp1, Mp2, Mp3.

In this manner, according to this embodiment, when any one of the modes 1, 2, 3 is selected in response to the manipulation of the mode selection switch 8 by the driver, the corresponding mode map Mp1, Mp2 or Mp3 is selected, and the target torque is set based on the mode map Mp1, Mp2 or Mp3 and hence, the driver can enjoy three kinds of acceleration responses which differ completely from each other using one vehicle.

Here, an open/close speed of the throttle valve is also set such that the throttle valve is operated gently in the mode map Mp2 and is rapidly operated in the mode map Mp3.

Further, the T/M_ECU 23 is provided for performing the gear change control of the automatic transmission. To an input side of the T/M_ECU 23, a vehicle speed sensor 41 which detects a vehicle speed based on a rotational speed of a transmission output shaft or the like, an inhibiter switch 42 which detects a range in which the selection lever 7 is positioned are connected, while to an output side of the T/M_ECU 23, a control valve 43 which performs the gear change control of the automatic transmission and a lock-up actuator 44 which performs a lock-up operation of a lock-up clutch are connected. The T/M_ECU 23 determines the range of the selection lever 7 in response to a signal from the inhibitor switch 42. When the selection lever 7 is positioned in a D range, the T/M_ECU 23 performs the change gear control by outputting a change gear signal to the control valve 43 in accordance with a predetermined transmission pattern. Here, the transmission pattern is variably set corresponding to the modes 1, 2, 3 set in the E/G_ECU 22.

Further, when the lock-up condition is satisfied, a slip lock-up signal or a lock-up signal is outputted to the loch-up actuator 44 so as to changeover the relationship between input/output elements of a torque converter into a slip lock-up state or a lock-up state from a converter state. Here, the E/G_ECU 22 corrects the target torque $\tau e$ when the state of the torque converter is changed to a slip lock-up state or a lock-up state. As a result, for example, when the mode M is set to the save mode 2, the target torque τe is corrected to the one which allows more fuel-efficient traveling.

The navigation_ECU 24 is mounted in a well-known car navigation system, and detects a position of the vehicle based on positional data obtained from a GPS satellite or the like and, at the same time, calculates a guide route to the destination. Further, the navigation_ECU 24 displays the present position and the guide route of the own car as the map data on the center display 4. In this embodiment, the navigation_ECU 24 can display various information to be displayed on the MID 12 on the center display 4.

Next, steps for controlling the operation state of the engine executed by the above-mentioned E/G_ECU 22 is explained in accordance with flowcharts shown in FIG. 7 to FIG. 10.

Figure 7:
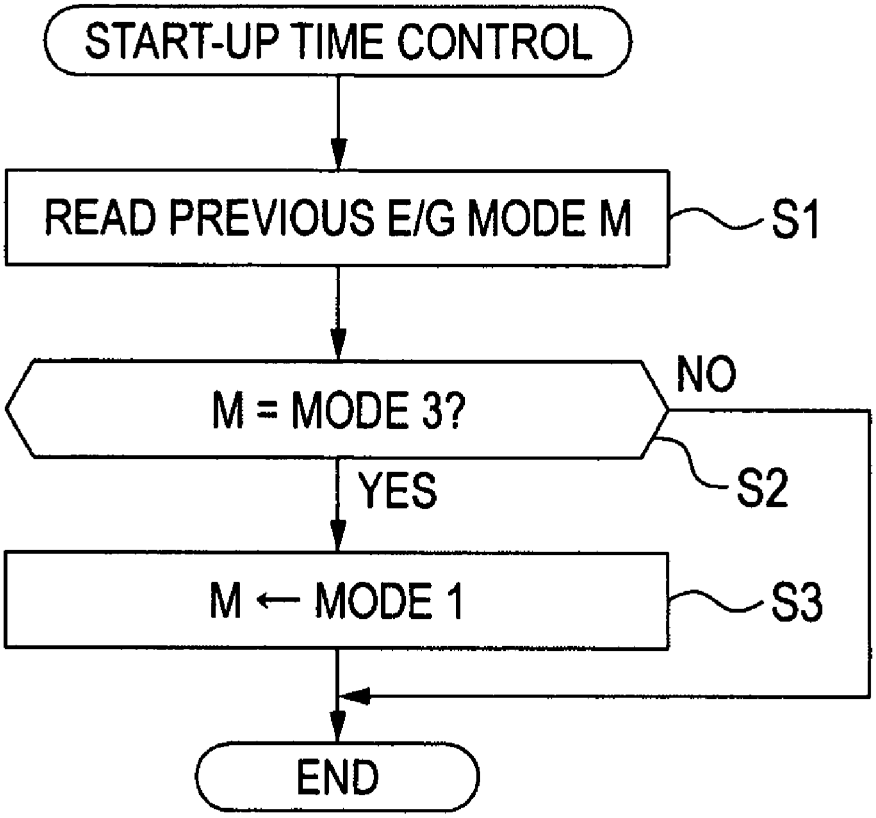
FIG. 7 is a flowchart showing a start-up time control routine according to the first embodiment.

When the ignition switch is turned on, first of all, the start-up time control routine shown in FIG. 7 is initiated only one time. In this routine, first of all, in step S1, the mode M (M: normal mode 1, save mode 2, power mode 3) stored the last time the ignition switch was turned off is read.

Then, the processing advances to step S2, and it is determined whether the mode M is the power mode 3 or not. When the mode M is the power mode 3, the mode M is forcibly set to the normal mode 1 (M←mode 1) and the routine is finished.

Further, when the mode M is the mode other than the power mode 3, that is, the normal model or the save mode 2, the routine is finished as it is.

In this manner, when the mode M stored the last time the ignition switch was turned off is the power mode 3, the mode M at the time of turning on the ignition switch is forcibly changed to the normal mode 1 (M←mode 1), hence there is no possibility that the vehicle starts rapidly and, thus, the vehicle can obtain the favorable start performance even when the accelerator pedal 14 is slightly depressed.

Figure 8:
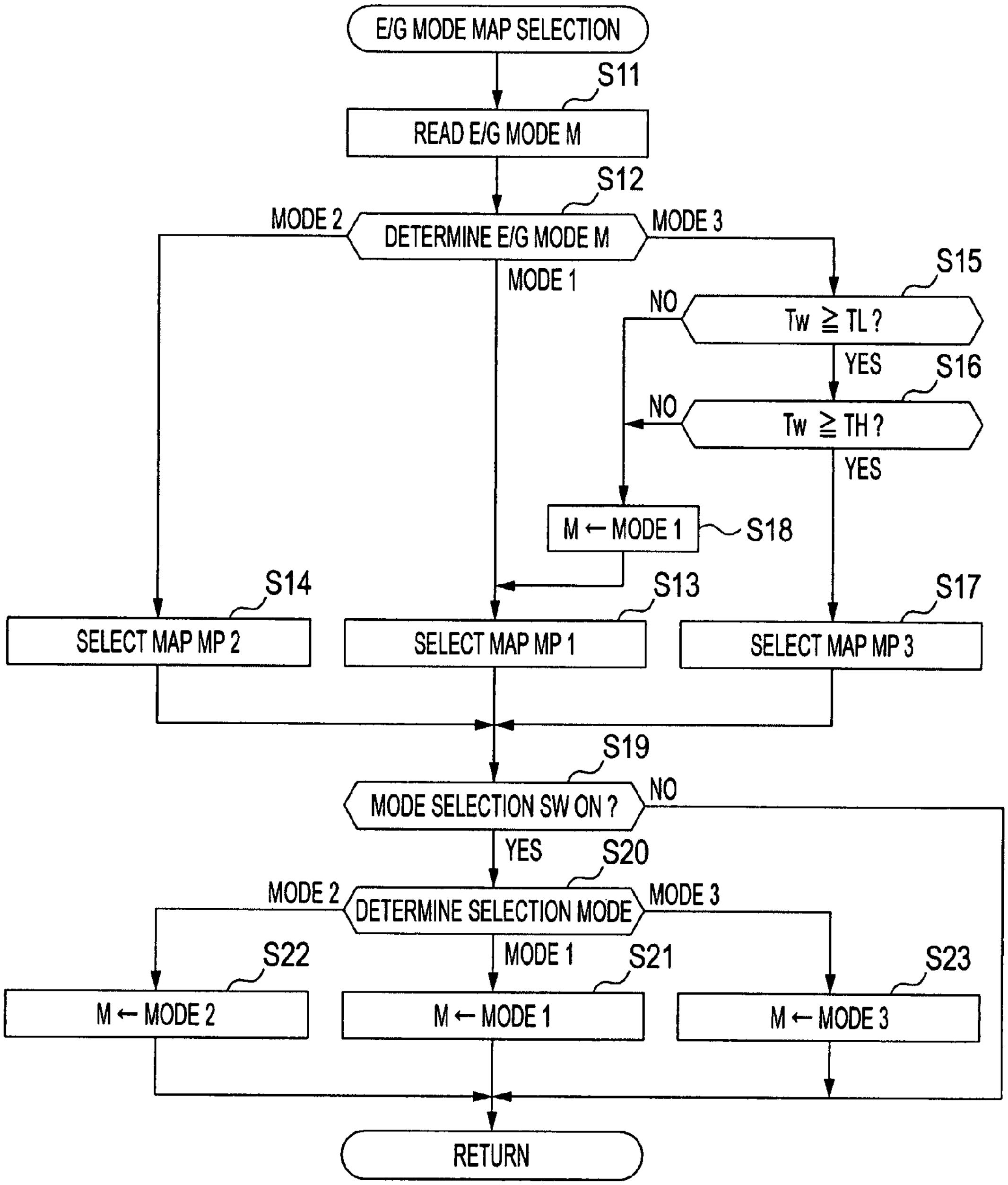
FIG. 8 is a flowchart showing a mode map selection routine according to the first embodiment.
Figure 9:
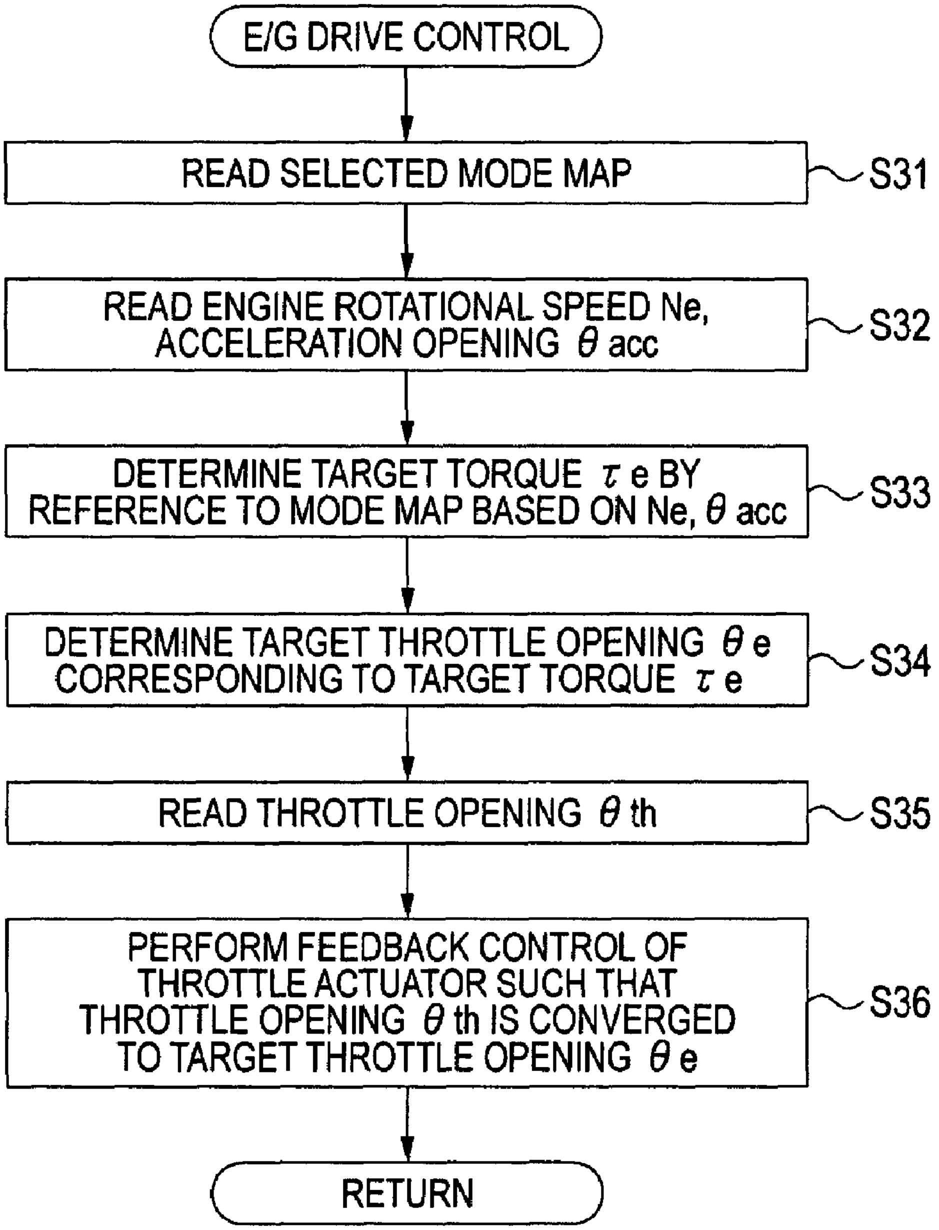
FIG. 9 is a flowchart showing an engine control routine according to the first embodiment.
Figure 10:
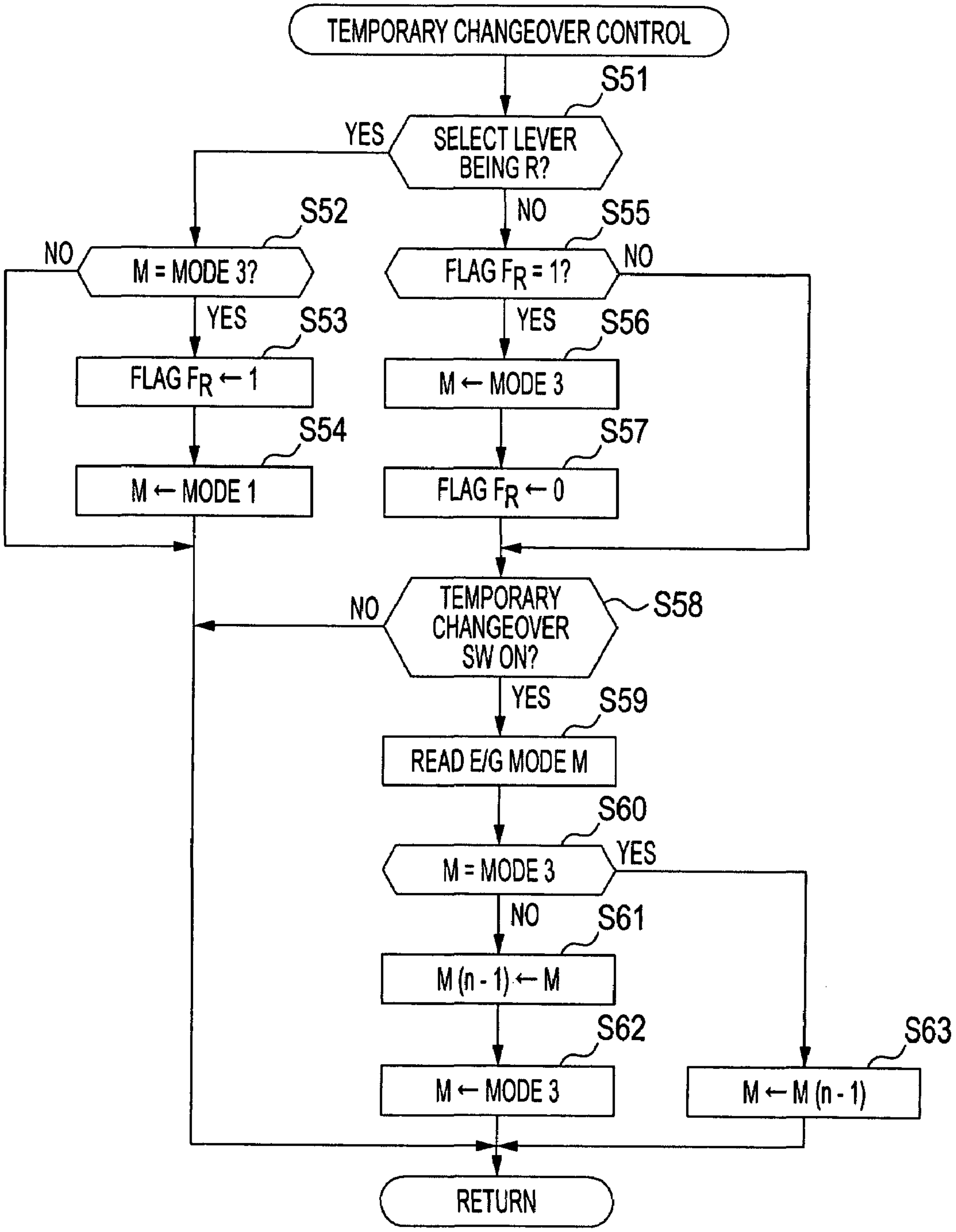
FIG. 10 is a flowchart showing a temporary changeover control routine according to the first embodiment.

Then, when this start-up time control routine is finished, the routines shown in FIG. 8 to FIG. 10 are executed for every predetermined calculation cycle. First of all, the mode map selection routine shown in FIG. 8 is explained.

In this routine, first of all, the currently set mode M is read in step S11, and it is determined which mode (normal mode 1, save mode 2 or power mode 3) is set by reference to the number of the mode M in step S12. Then, when set is the normal mode 1, the processing advances to step S13. When set is the save mode 2, the processing is branched to step S14. Further, when set is the power mode 3, the processing is branched to step S15. Here, at the time of executing the first routine after the ignition switch is turned on, the mode M is either one of the normal mode 1 or the save mode 2 and hence, the processing is not branched in step S15. However, when the driver rotates the manipulation knob 8*a* of the mode selection switch 8 in the right direction after the ignition switch is turned on to select the power S# mode, the mode M is set to the power mode 3 in step S23 described later and hence, the processing is branched to step S15 from step S12 at the time of executing succeeding routine.

Then, when it is determined that the mode M is set to the normal mode 1 and the processing advances to step S13, the normal mode map Mp1 stored in the non-volatile memory means of the E/G_ECU 22 is set as the mode map of this time and the processing advances to step S19. Further, when it is determined that the mode M is set to the save mode 2 and the processing advances to step S14, the save mode map Mp2 is set as the mode map of this time and the processing advances to step S19.

On the other hand, when it is determined that the mode M is set to the power mode 3 and the processing is branched to step S15, in steps S15 and S16, a cooling water temperature Tw detected by the water temperature sensor 33 as the engine temperature is compared with a predetermined lower temperature as a warm-up determination temperature TL and a predetermined upper temperature as an over heat determination temperature TH. Then, when it is determined that the cooling water temperature Tw is equal to or above the warm-up determination temperature TL (Tw≧TL) in step S15 and when it is determined that the cooling water temperature Tw is below the over heat determination temperature TH (Tw<TH) in step S16, the processing advances to step S17.

On the other hand, when it is determined that the cooling water temperature Tw is below the warm-up determination temperature TL (Tw<TH) in step S15 or when it is determined that the cooling water temperature Tw is equal to or above the over heat determination temperature TH (Tw>TH) in step S16, the processing is branched to step S18 and the mode M is set to normal mode 1 (M←mode 1) and the processing returns to step S13.

In this manner, according to this embodiment, even when the driver manipulates the mode selection switch 8 to select the power mode 3 after the ignition switch is turned on, the mode M is forcibly made to return to the normal mode 1 in the event that the cooling water temperature Tw is equal to or below the warm-up determination temperature TL or equal to or above the over heat determination temperature TH. Accordingly, a discharge quantity of exhaust emission can be suppressed at the time of engine warm-up, and the engine and its peripheral equipment can be protected from a heat defect by suppressing the output at the time of over heat. Here, when the mode M is forcibly made to return to the normal mode 1, the warning lamp 3*f* is turned on or blinked to inform the driver that the mode M is forcibly made to return to the normal mode 1. In this case, the return of the mode M to the normal mode 1 may be notified by a buzzer or sounds.

Next, when the processing advances to step S19 from any one of steps S13, S14 and S17, it is determined whether the mode selection switch 8 is manipulated or not. When it is determined that the manipulation of the mode selection switch 8 is not performed, the routine is finished. Further, when it is determined that the manipulation of the mode selection switch 8 is performed, the processing advances to step S20 and it is determined which mode is selected by the driver.

Then, when it is determined that the driver selects the normal mode (the knob 8*a* being rotated in the left direction), the processing advances to step S21 to set the mode M to the normal mode 1 (M←mode 1), and the routine is finished. Further, when it is determined that the driver selects the save mode 2 (the knob 8*a* being pushed) (M←mode 2), the processing advances to step S22 to set the mode M to the save mode 2 (M←mode 2), and the routine is finished. Further, when it is determined that the driver selects the power mode 3 (the knob 8*a* being rotated in the right direction), the processing advances to step S23 to set mode M to the power mode 3 (M←mode 3), and the routine is finished.

In this manner, in this embodiment, the E/G_ECU 22 functions as the mode selection control means.

In this embodiment, the mode M can be set to the power mode 3 by manipulating the knob 8*a* of the mode selection switch 8 after turning on the ignition switch and hence, it is also possible to start the vehicle with the power mode 3. In this case, the driver consciously selects the power mode and hence, the driver would not be frightened at the large driving force generated at the start.

Next, an engine control routine shown in FIG. 9 is explained.

In this routine, first of all, in step S31, the currently selected mode map (Mp1, Mp2 or Mp3: see FIG. 11) is read and, subsequently, in step S32, an engine rotational speed Ne detected by the engine rotational sensor 29 and accelerator opening degree θacc detected by the accelerator opening sensor 31 are read.

Then, the processing advances to step S33 in which a target torque τe which constitutes a driving force indication value is determined based on both parameters Ne and θacc by reference to the mode map read in step S31 with the interpolation calculation.

Next, the processing advances to step S34 in which a target throttle opening degree θe corresponding to the target torque τe is determined as a final driving force indication value.

Then, the processing advances to step S35 in which a throttle opening degree θth detected by the throttle opening sensor 32 is read. In step S36, a feedback control is applied to the throttle actuator 37 which performs an open/close operation of the throttle valve mounted in the electronically controlled throttle device such that the throttle opening degree θth is converged to the target throttle opening degree θe. Then, the routine is finished.

As a result, when the driver manipulates the accelerator pedal 14, the throttle valve is opened or closed in accordance with the mode maps Mp1, Mp2 and Mp3 corresponding to the mode M (M: normal mode 1, save mode 2, power mode 3) selected by the driver, using the accelerator opening degree θacc and the engine rotational speed Ne as parameters. When the mode M is set to the normal mode 1, an output torque is preset approximately linearly with respect to an operation amount of the accelerator pedal (accelerator opening degree θacc) and hence, the normal driving can be performed.

Further, when the mode M is set to the save mode 2, the elevation of the target torque is suppressed and hence, the driver can enjoy the acceleration work by widely using the stroke of the accelerator pedal 14 and, at the same time, it is possible to acquire both of easy drive ability and low fuel consumption in a well-balanced manner. Accordingly, even in case of a vehicle with a 3 litter engine, the smooth driving can be performed while ensuring a sufficient output corresponding to the 2 litter engine and hence, the vehicle can obtain the favorable driving performance in a practical-use region such as towns and the cities.

Further, when the mode M is set to the power mode 3, a high acceleration response is obtained and hence, the vehicle can perform more sporty traveling.

As a result, the driver can enjoy three kinds of acceleration responses which completely differ from each other with one vehicle. Accordingly, the driver can arbitrarily select the preferred driving force characteristic even after purchasing the vehicle and can drive the vehicles corresponding to three vehicles having different characteristics with one vehicle.

Further, in this embodiment, when the temporary changeover switch 11 which is mounted on the steering wheel 9 is manipulated or the selection lever 7 is positioned to the R range, the mode M is temporarily changed over. This temporarily changeover control is executed in accordance with a temporarily changeover control routine shown in FIG. 10.

In this routine, first of all, it is determined whether the selection lever 7 is positioned to the R range or not based on a signal from the inhibitor switch 42 in step S51. When it is determined that the selection lever 7 is positioned to the R range, the processing advances to step S52, while when the selection lever 7 is positioned to a range other than the R range, the processing advances to step S55.

When the processing advances to step S52, the current mode M is referred and the routine is finished except for a state in which the mode M is set to the power mode 3. Further, when the mode M is set to the power mode 3, the processing advances to step S53 to set a reverse flag FR (FR←1) and the processing advances to step S54 to set the mode M to the normal mode 1 (M←mode 1) and the routine is finished.

In this manner, according to this embodiment, when the selection lever 7 is moved to the R range in a state that the mode M is set to the power mode 3, the mode M is forcibly changed over to the normal mode 1 and hence, even when the accelerator pedal 14 is depressed slightly at driving the vehicle backward, there is no possibility that the vehicle suddenly travels backward thus acquiring the favorable backward travel performance.

On the other hand, when it is determined that the selection lever 7 is positioned to the range other than the R range in step S51 and the processing advances to step S55, the reverse flag FR is referred. When the reverse flag FR is 1 (FR=1), that is, in the first routine after the selection lever 7 is changed over to another range from the R range, the processing advances to step S56 in which the mode M is made to return to the power mode 3 (M←mode 3). Then the processing advances to step S57 in which the reverse flag FR is cleared (FR←0) and the processing advances to step S58.

As a result, in a state that after the mode M is forcibly changed over to the normal mode 1 from the power mode 3 because of the manipulation of the selection lever 7 to the R range, the selection lever 7 is moved to the D range, for example, the mode M is made to automatically return to the initial power mode 3 and hence, the driver can start the vehicle without feeling a discomfort.

Further, when it is determined that the reverse flag FR is 0 (FR=0) in step S55, the processing jumps to step S58.

Then, when the processing advances to step S58 from step S55 or step S57, it is determined whether the temporary changeover switch 11 is turned on or not. Then, when it is determined that the temporary changeover switch 11 is not turned on, the routine is finished as it is.

On the other hand, when it is determined that the temporary changeover switch 11 is turned on, the processing advances to step S59 to read the current mode M, and in step S60, it is determined whether the mode M is set to the power mode 3 or not.

Then, when it is determined that the mode M is set to a mode (normal mode 1 or save mode 2) other than the power mode 3, the processing advances to step S61 in which the mode M at the time the temporary changeover switch 11 is turned on is stored as a previous mode M(n−1) (M(n−1)←M) and the processing advances to step S62. In step S62, the current mode M is set to the power mode 3 (M←mode 3) and the routine is finished.

In this manner, according to this embodiment, even when the mode M is set to the normal mode 1 or the save mode 2 using the mode selection switch 8, the mode M can be changed over to the power mode 3 by turning on the driver's-side temporary changeover switch 11. As a result, in traveling an ascending slope which requires power, the mode M can be easily changed over to the power mode 3 from the normal mode 1 or the save mode 2 temporarily and hence, the vehicle can acquire the favorable traveling performance. Further, the temporary changeover switch 11 is mounted on the steering wheel 9 and hence, the driver can easily change over the mode M without leaving his/her hand from the steering wheel 9 thus improving the manipulability.

Further, when it is determined that the current mode M is set to the power mode 3 in step S60, the processing is branched to the step S63 in which the previous mode M(n−1) is read to be the current mode M (M←M(n−1)) and the routine is finished.

As a result, by manipulating the temporary changeover switch 11 again after the mode M is temporarily changed over to the power mode 3, the mode M is made to return to the initial mode M (normal mode 1 or save mode 2).

Next, a second embodiment of the present invention is explained in conjunction with FIG. 12 to FIG. 15. Here, this embodiment mainly differs from the above-mentioned first embodiment with respect to a point that the temporary changeover mode Mt achieved by the temporary changeover switch 11 can be preliminarily set to an arbitrary mode selected by a driver and/or a point that the temporary changeover mode Mt is capable of automatically returning to the previous mode M(n−1) without manipulation of the temporary changeover switch 11 again when the preset return condition is established after the temporary changeover mode Mt is carried out using the temporary changeover switch 11.

First of all, the preliminary setting of the temporary changeover mode Mt is explained. In this embodiment, a preliminary setting control of the temporary changeover mode Mt is, for example, executed by the E/G_ECU 22 in accordance with a temporary changeover mode setting routine shown in FIG. 12 based on a manipulation input of the driver using the mode selection switch 8 and the temporary changeover switch 11. That is, in this embodiment, the E/G_ECU 22 functions as a temporary changeover mode setting means. Here, in this embodiment, by using the mode selection switch 8 and the temporary changeover switch 11 in combination, the driver can perform the manipulation inputting for setting the temporary changeover mode Mt he or she requires without additionally providing new switches.

This routine is triggered by a pushing manipulation of the mode selection switch 8 (that is, an ON operation of the switch 8 for selecting the save mode 2) when the vehicle is stopped with the selection lever 7 being an N range or a P range. When the routine starts, the E/G_ECU 22 firstly determines whether the mode selection switch 8 is being manipulated by pushing or not in step S71.

As a result, when it is determined that the push manipulation applied to the mode selection switch 8 is released in step S71, the routine is finished at it is.

On the other hand, when it is determined that mode selection switch 8 is held down (when it is determined that the push manipulation is being continued) in step S71, the processing advances to step S72 to determine whether a set time (for example, 3 seconds) is elapsed from starting of the push manipulation of the mode selection switch 8 or not.

As a result, when it is determined that the set time is not yet elapsed from starting of the push manipulation of the mode selection switch 8 in step S72, the processing returns to step S71.

On the other hand, when it is determined that the mode selection switch 8 is held down for the set time in step S72, the processing advances to step S73 to determine whether the ON manipulation of the temporary changeover switch 11 is performed or not.

As a result, when it is determined that the ON manipulation of the temporary changeover switch 11 is not performed in step S73, the processing returns to step S71.

On the other hand, when it is determined that the ON manipulation of the temporary changeover switch 11 is performed in step S73, the processing advances to step S74 in which preliminary setting of the temporary changeover mode Mt is allowed to start. Then, the processing advances to step S75. Here, the E/G_ECU 22 instructs the meter_ECU 21 to interrupt the display on the MID 12 to show a preset image indicative of the start of preliminarily setting the temporary changeover mode. Due to such processing, on the MID 12, the image shown in FIG. 13(*a*) is displayed, for example.

In this manner, the E/G_ECU 22, when the temporary changeover switch 11 is manipulated in a state that the mode selection switch 8 is held down for a set time or more, allows the preliminary setting of the temporary changeover mode Mt. Accordingly, it is possible to properly prevent the temporary changeover mode Mt from being carelessly changed due to an erroneous manipulation by a driver.

When the processing advances to step S75 from step S74, it is determined whether the mode selection switch 8 is being manipulated by pushing or not. When it is determined that the mode selection switch 8 is being manipulated by pushing, the processing advances to step S76 in which it is determined whether the ON manipulation of the temporary changeover switch 11 is performed or not.

As a result, when it is determined that the ON manipulation of the temporary changeover switch 11 is not performed in step S76, the processing returns to step S75.

Figure 13A:
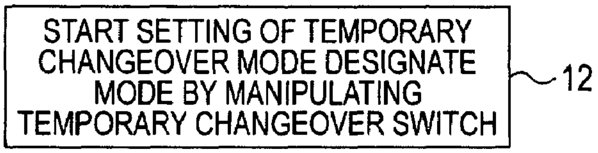
FIG. 13 is an explanatory view showing a display example of a multi-information display at the time of setting the temporary changeover mode according to the second embodiment.
Figure 13B:
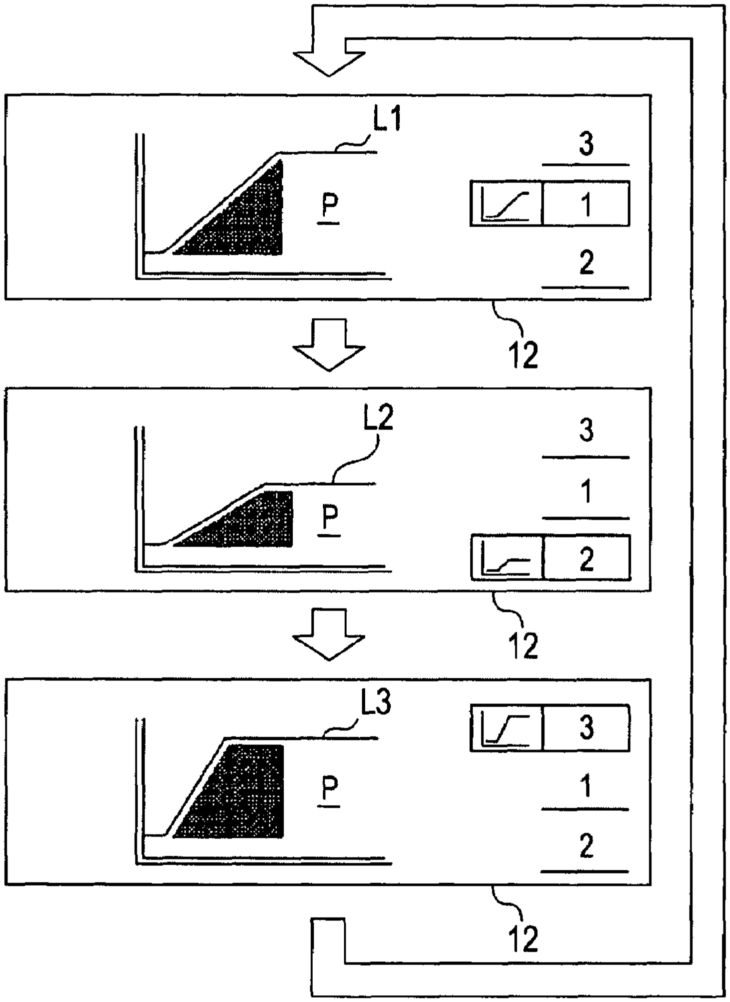
Figure 13C:
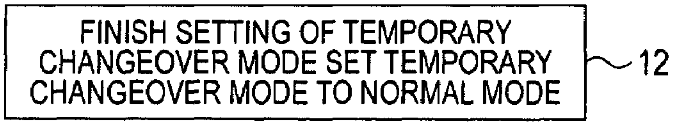
Figure 14:
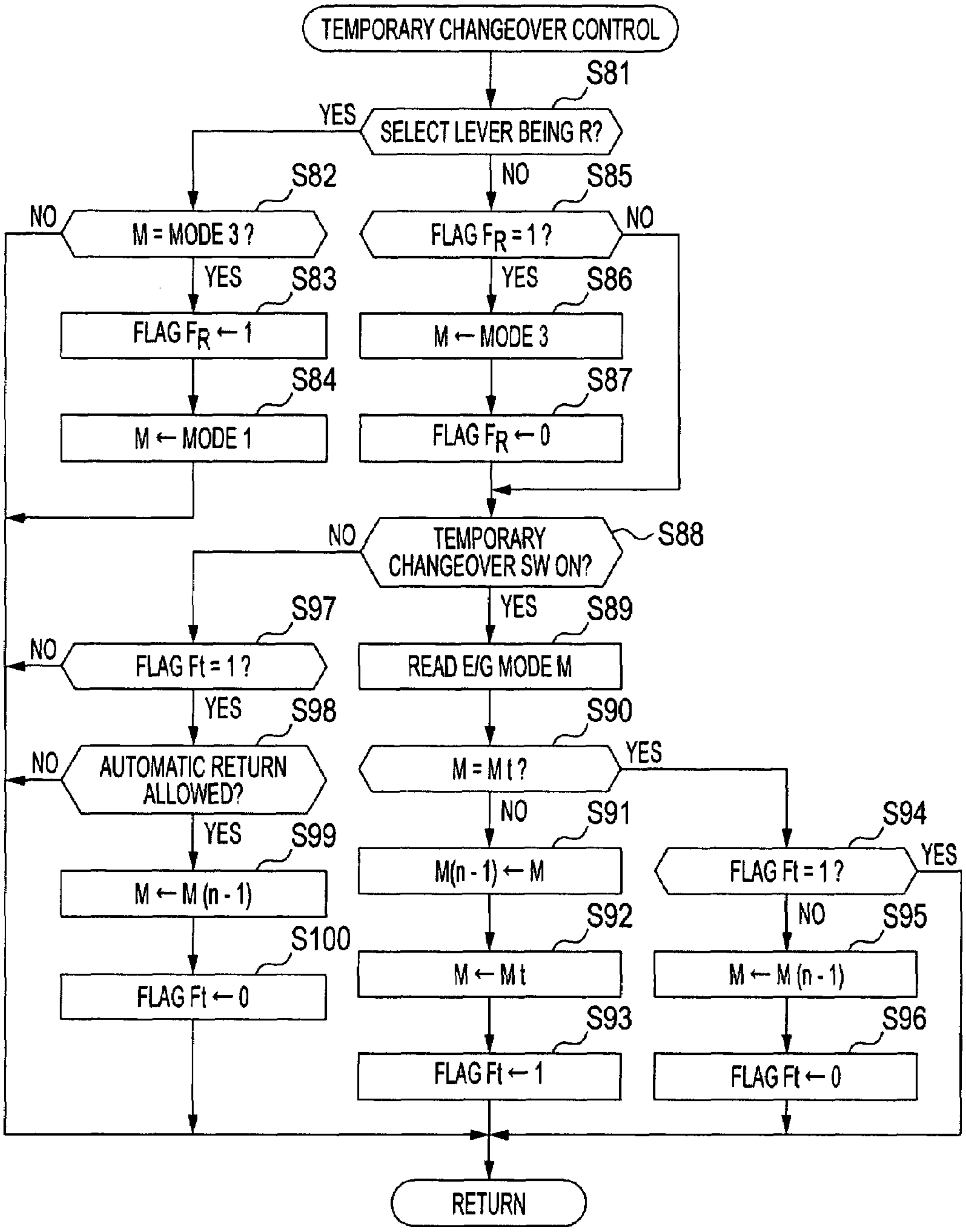
FIG. 14 is a flowchart showing the temporary changeover control routine according to the second embodiment.
Figure 15:
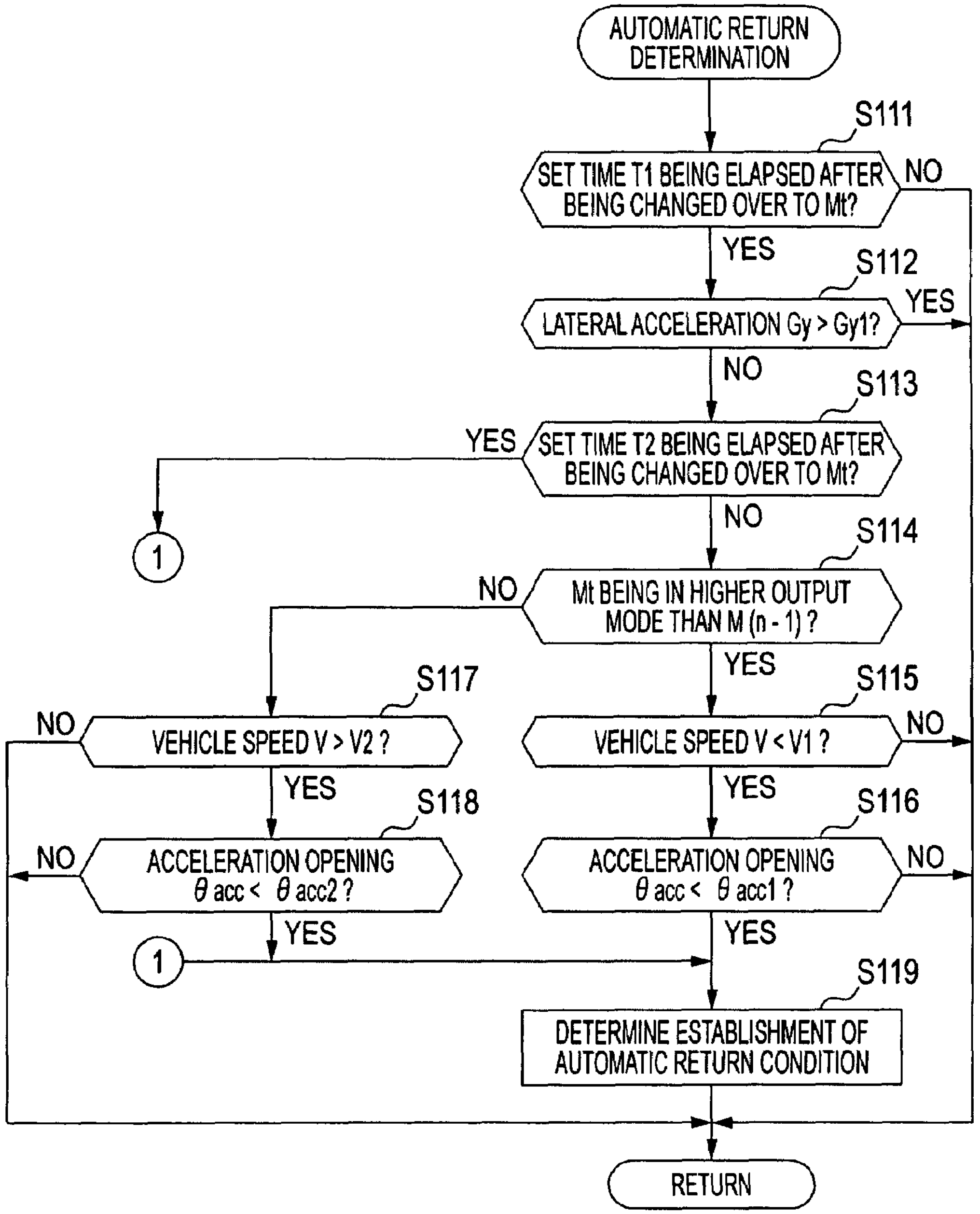
FIG. 15 is a flowchart showing an automatic return determination routine from the temporary changeover mode according to the second embodiment.

On the other hand, when it is determined that the ON manipulation of the temporary changeover switch 11 is performed in step S76, the processing advances to step S77 to shift the current temporary changeover mode Mt in the forward feeding direction, for example, and the processing returns to step S75. That is, when the normal mode 1 is designated currently, the E/G_ECU 22 designates the save mode 2 as the new temporary changeover mode Mt. Further, when the save mode 2 is designated currently, the E/G_ECU 22 designates the power mode 3 as the new temporary changeover mode Mt. Still further, when the power mode 3 is currently designated, the E/G_ECU 22 designates the normal mode 1 as the new temporary changeover mode Mt. Here, the E/G_ECU 22 instructs the meter_ECU 21 to show the mode which is newly designated as the temporary changeover mode Mt on the MID 27. According to such processing, each time the new mode is re-designated by the ON manipulation of the temporary changeover switch 11, the information of the corresponding mode is sequentially changed over and displayed on the MID 12, as shown in FIG. 13(*b*).

Further, when it is determined that the push manipulation of the mode selection switch 8 is released in step S75, the processing advances to step S78 and the currently designated mode is finally fixed as the preliminarily selected temporary changeover mode Mt and, thereafter, the routine is finished. Here, the E/G_ECU 22 instructs the meter_ECU 21 to interrupt the display on the MID 12 to show a preset image indicative of the end of preliminary setting of the temporary changeover mode. Due to such processing, on the MID 12, the image shown in FIG. 13(*c*) is displayed, for example. Here, FIG. 13(*c*) illustrates the image when the normal mode 1 is finally set as the preliminarily selected temporary changeover mode.

Next, the temporary changeover control of the mode is explained. In this embodiment, the temporary changeover control of the mode is executed by the E/G_ECU 22 in accordance with a flowchart of a temporary changeover control routine shown in FIG. 14, for example. Here, when the return conditions described later is determined in a state that the temporary changeover mode Mt is selected, the E/G_ECU 22 makes the mode automatically return to the previous mode from the temporary changeover mode Mt without waiting for the manipulation inputting of a driver using the temporary changeover switch 11. In this manner, in this embodiment, the E/G_ECU 22 has functions of a temporary changeover control means and an automatic return control means.

The routine is repeatedly executed for every set time. When the routine starts, the E/G_ECU 22 performs, in step S81 to step S87, processing substantially equal to processing shown in step S51 to step S57 explained in conjunction with the above-mentioned first embodiment. Then, when the processing advances to step S88 from step S85 or step S87, the E/G_ECU 22 determines whether the temporary changeover switch 11 is turned on or not. When the temporary changeover switch 11 is not turned on, the processing advances to step S97.

On the other hand, when it is determined that the temporary changeover switch 11 is turned on in step S88, the processing advances to step S89 to read the current mode M. In step S90, the E/G_ECU 22 determines whether the current mode M is equal to the preliminarily selected temporary changeover mode Mt or not.

Here, when the mode M is a mode other than the preliminarily selected temporary changeover mode Mt, the processing advances to step S91 in which the mode M at the time the temporary changeover switch 11 is turned is stored as a previous mode M(n−1) (M(n−1)←M). And then, the processing advances to step S92 in which the current mode M is set as the preliminarily selected temporary changeover mode Mt (M←Mt) and the processing advances to step S93. In step S93, a temporary changeover flag Ft which indicates that the preliminarily selected temporary changeover mode Mt is fixed as the current mode M is set (Ft←1) and, thereafter, the routine is finished.

Further, when it is determined that the current mode M is equal to the preliminarily selected temporary changeover mode Mt in step S90 and the processing is branched to step S94 in which a value of the temporary changeover flag Ft is referenced so that the E/G_ECU 22 determines whether Ft is set to 1 (Ft=1) or not, that is, the current mode M corresponding to the preliminarily selected temporary changeover mode Mt is carried out using the temporary changeover switch 11 or not.

As a result, when it is determined that the temporary changeover flag Ft is set to 1 (Ft=1) in step S94, the processing advances to step S95 to set the mode M to the stored previous mode M(n−1) (M←M(n−1)). And then the processing advances to step S96 in which the temporary changeover flag Ft is reset (Ft←0) and, thereafter, the routine is finished.

On the other hand, when it is determined that the temporary changeover flag Ft is set to 0 ((Ft=0) in step S94, the routine is finished at it is.

Further, when it is determined that the temporary changeover switch 11 is not turned on in step S88, the processing is branched to step S97 in which the value of the temporary changeover flag Ft is referenced so that the E/G_ECU 22 determines whether Ft is set to 1 (Ft=1) or not, that is, the preliminarily selected temporary changeover mode Mt is set as the current mode M using the temporary changeover switch 11 or not. Then, when it is determined that the temporary changeover flag Ft is set to 0 (Ft=0) in step S97, the routine is finished.

On the other hand, when it is determined that the temporary changeover flag Ft is set to 1 (Ft=1) in step S97, the processing advances to step S98 to determine whether the conditions for allowing to automatically return to the previous mode M(n−1) from the temporary changeover mode Mt are satisfied or not. Then, when it is determined that the automatic return conditions are not satisfied in step S98, the routine is finished.

On the other hand, when it is determined that the automatic return conditions are satisfied in step S98, the processing advances to step S99 to set the stored previous mode M(n−1) as the current mode M (M←M(n−1)). And then, the processing advances to step S100 in which the temporary changeover flag Ft is reset (Ft←0) and, thereafter, the routine is finished. Here, when the mode is made to automatically return to the previous mode M(n−1) from the preliminarily selected temporary changeover mode Mt, it is desirable that the E/G_ECU 22 turns on or flickers a warning lamp 3*f* using the meter_ECU 21 to notify that the mode M is made to automatically return. In this case, the automatic return of the mode may be notified by buzzer or sounds.

Next, the automatic return determination which determines the possibility of automatic return to the previous mode M(n−1) from the temporary changeover mode Mt is explained. In this embodiment, the automatic return determination is executed by the E/G_ECU 22 in accordance with a flowchart of the automatic return determination routine shown in FIG. 15, for example. In this automatic return determination, the E/G_ECU 22 determines the possibility of the automatic return based on at least the manipulation of the accelerator by a driver. To be more specific, when the temporary changeover mode Mt is a mode of higher output than the previous mode M(n−1), the automatic return is permitted in the condition that the accelerator is manipulated in the closing direction by the driver. To the contrary, when the preliminarily selected temporary changeover mode Mt is a mode of lower output than the previous mode M(n−1), the automatic return is permitted in the condition that the accelerator is manipulated in the opening direction by the driver. Further, this automatic return determination includes various forbidden conditions which forbid the automatic return. Even when the manipulation of the accelerator by the driver satisfies the aforementioned return condition, the E/G_ECU 22 forbids the automatic return from the temporary changeover mode Mt in case that the foregoing forbidden conditions are established. In this manner, in this embodiment, the E/G_ECU 22 functions as a return determination means.

This routine is repeatedly executed for every set time on the premise that the above-mentioned temporary changeover flag Ft is set to "1", for example. When the routine starts, the E/G_ECU 22 firstly determines, in step S111, whether a preset time T1 or more is elapsed after the mode M is changed over to the temporary changeover mode Mt or not. Here, the time T1 is a holding time for forbidding the mode M from automatically returning to the previous mode M(n−1) immediately after the mode M is changed over to the temporary changeover mode Mt. The time T1 is set to approximately several seconds to several ten seconds. That is, although the automatic return is determined mainly based on the manipulation of the accelerator as described above in this embodiment, it is hardly conceivable that the driver readily shifts his or her driving behavior immediately after the mode M is changed to the temporary changeover mode Mt. Further, when the mode M automatically returns to the mode previous M(n−1) immediately after the mode M is changed over to the temporary changeover mode Mt, the operation may gives a discomfort to the driver. Accordingly, when it is determined that the time lapsed after the mode M is changed over to the temporary changeover mode Mt is shorter than T1 in step S111, the routine is finished as it is, so as to forbid the automatic return.

On the other hand, when it is determined that the time lapsed after the mode M is changed over to the temporary changeover mode Mt is equal to or longer than T1 in step S111, the processing advances to step S112 in which it is determined whether a lateral acceleration Gy which acts on the vehicle is larger than a preset threshold value Gy1 or not.

That is, for example, in a traveling state that the lateral acceleration Gy is large as in the case of a curve traveling state, it is not desirable to change the driving force characteristic of the engine which largely influences the behavior of the vehicle. Accordingly, when it is determined that the lateral acceleration Gy is larger than the threshold value Gy1 in step S112, the routine is finished as it is, so as to forbid the automatic return.

On the other hand, when it is determined that the lateral acceleration Gy is equal to or smaller than the threshold value Gy1 in step S112, the processing advances to step S113 in which it is determined whether a preset time T2 or more is elapsed after the mode M is changed over to the temporary changeover mode Mt or not. Here, the time T2 is a maximum time for allowing the mode M to be held in the temporary changeover mode Mt and is set to approximately several minutes to several ten minutes. That is, to consider the concept as the temporary changeover of the mode M, it is not desirable to hold the temporary changeover mode Mt selected using the temporary changeover switch 11 for an excessively long time. Further, basically, when a driver wants to consciously hold the mode set as the temporary changeover mode Mt for a long time, it is sufficient for the deiver to select the mode using the mode selection switch 8. Accordingly, when it is determined that the lapsed time after the mode is changed over to the temporary changeover mode Mt is equal to or more than the time T2 in step S113, as a particular case, the processing advances to step S119 to allow the automatic return. Here, the time T2 may be suitably changed in response to the mode which is currently set as the temporary changeover mode Mt, the vehicle speed or the like, for example.

On the other hand, when it is determined that the lapsed time after the mode is changed over to the temporary changeover mode Mt is shorter than the time T2 in step S113, the processing advances to step S114 in which it is determined whether the temporary changeover mode Mt is a mode of a higher output than the previous mode M(n−1) or not. As a result, when it is determined that the preliminarily selected temporary changeover mode Mt is the mode of a higher output than the previous mode M(n−1) in step S114, the processing advances to step S115. When it is determined that the preliminarily selected temporary changeover mode Mt is the mode of a lower output than the previous mode M(n−1), the processing advances to step S117. To be more specific, in case that the normal mode 1 is set as the temporary changeover mode Mt, when the previous mode M(n−1) is the save mode 2, the processing advances to step S117, while when the previous mode M(n−1) is the power mode 3, the processing advances to step S115. Further, in case that the save mode 2 is set as the temporary changeover mode Mt, when the previous mode M(n−1) is either the normal mode 1 or the power mode 3, the processing advances to step S117. Further, in case that the power mode 3 is set as the temporary changeover mode Mt, when the previous mode M(n−1) is either the normal mode 1 or the save mode 2, the processing advances to step S115.

When it is determined that the temporary changeover mode Mt is the mode of a higher output than the previous mode M(n−1) in step S114, the processing advances to step S115 in which it is determined whether a vehicle speed V is smaller than a threshold value V1 or not. Here, the threshold value V1 may be set as a fixed value or a variable value variably set depending on a vehicle speed V0 at a moment that the mode M is changed over to the temporary changeover mode Mt. To be more specific, it is preferable to set the threshold value V1 to a value which is higher than the vehicle speed V0 by approximately several [Km/h] to ten and several [Km/h]. Further, the threshold value V1 may be set to a value which differs corresponding to the mode set as the temporary changeover mode Mt.

When it is determined that the vehicle speed V is equal to or more than the threshold value V1 in step S115, the routine is finished as it is, so as to forbid the automatic return.

On the other hand, when it is determined that the vehicle speed V is less than the threshold value V1 in step S115, the processing advances to step S116 in which it is determined whether accelerator opening degree θacc is smaller than a threshold value θacc1 or not. Here, the threshold value θacc1 may be set as a fixed value or a value which differs corresponding to the mode set as the temporary changeover mode Mt, for example. Further, it is desirable to variably set the threshold value θacc1 to a value several [%] to ten-odd [%] larger than the accelerator opening degree θacc0 at a moment that the mode M is changed over to the temporary changeover mode Mt.

Then, when it is determined that the accelerator opening degree θacc is equal to or more than the threshold value θacc1 in step S116, the routine is finished as it is, so as to forbid the automatic return. On the other hand, when it is determined that the accelerator opening degree θacc is less than the threshold value θacc1 in step S116, the processing advances to step S119.

When it is determined that the temporary changeover mode Mt is the mode of a lower output than the previous mode M(n−1) in step S114, the processing advances to step S117 in which it is determined whether the vehicle speed V is larger than a threshold value V2 or not. Here, the threshold value V2 may be set to a fixed value or a variable value variably set depending on the vehicle speed V0 at a moment that the mode M is changed over to the temporary changeover mode Mt. To be more specific, it is preferable to set the threshold value V2 to a value lower than the vehicle speed V0 by approximately several [Km/h] to ten-odd [Km/h]. Further, the threshold value V2 may be set to a value which differs corresponding to the mode set as the temporary changeover mode Mt.

When it is determined that the vehicle speed V is equal to or less than the threshold value V2 in step S117, the routine is finished as it is, so as to forbid the automatic return.

On the other hand, when it is determined that the vehicle speed V is more than the threshold value V2 in step S117, the processing advances to step S118 in which it is determined whether the accelerator opening degree θacc is larger than a threshold value θacc2. Here, the threshold value θacc2 may be set to a fixed value or a value which differs corresponding to the mode which is set as the temporary changeover mode Mt, for example. Further, the threshold value θacc2 may be variably set to a value several [%] to ten-odd [%] larger than the accelerator opening degree θacc0 at a moment that the mode M is changed over to the temporary changeover mode Mt as the reference.

Then, when it is determined that the accelerator opening degree θacc is equal to or less than threshold value θacc2 in step S118, the routine is finished as it is, so as to forbid the automatic return. On the other hand, when it is determined that the accelerator opening degree θacc is more than threshold value θacc2 in step S116, the processing advances to step S119.

When the processing advances to step S119 from the step S113, step S116 or step S118, it is determined whether the automatic return conditions of the mode M are established, and the routine is finished by permitting the automatic return.

Here, in the above-mentioned automatic return determination, as the conditions for forbidding the automatic return, it is unnecessary to take all of the above-mentioned respective conditions (that is, the conditions of steps S111, S112, S115, S117) and these conditions may be suitably selectively adopted.

In this manner, according to this embodiment, a driver can preliminarily set an arbitrary mode as the temporary changeover mode Mt and hence, the driver can further enhance the easy-to-drive feeling. For example, when the driver prefers the fuel-efficient driving with suppressed power and therefore selects the save mode 2 using the mode selection switch 8 at the time of usual driving, by preliminarily setting the normal mode 1 or the power mode 3 as the temporary changeover mode Mt, the driver can readily change over the mode M to the normal mode 1 or the power mode 3 by means of the temporary changeover switch 11 at the time of passing a car. To the contrary, for example, the driver prefers the driving with the sharp acceleration/deceleration response and therefore selects the normal mode 1 or the power mode 3 using the mode selection switch 8 at the time of usual driving, by preliminarily setting the save mode 2 as the temporary changeover mode Mt, the driver can readily change over the mode M to the save mode 2 by means of the temporary changeover switch 11 at the time of traveling on a locally or partially wet or frozen road. That is, also when three modes are selectable as in the case of this embodiment, by preliminarily setting the predetermined mode other than the mode which conforms to a driving style of the driver himself/herself and is effective in a limited predetermined traveling scene as the temporary changeover mode Mt, the driver can instantaneously temporarily select the mode which conforms to the above-mentioned traveling scene without hesitation only by manipulating the temporary changeover switch 11 thus enhancing the easy-to-drive feeling.

Further, at the time of selecting the temporary changeover mode Mt, the determination of the automatic return is performed based on the preset return condition and, when the return determination is made, the mode M is made to automatically return to the previous mode (M(n−1)) from the temporary changeover mode Mt and hence, the easy-to-drive feeling of the driver can be further enhanced. In this case, by determining the permission of the return based on the manipulation of the accelerator by the driver, it is possible to realize the automatic return control which conforms to the feeling of the driver. Further, properly setting the various conditions for forbidding the automatic return of the mode M based on the driving state, the driving time and the like of the vehicle, it is possible to realize the automatic return control which further conforms to the feeling of the driver.

Here, the present invention is not limited to the above-mentioned embodiment and, for example, two kinds or four kinds or more mode maps having different driving force characteristics may be set. By setting the mode maps in this manner, the driver can drive the vehicle corresponding to two or four or more vehicles having different driving force characteristics using one vehicle. Further, the driving force characteristic of the mode map may be changed corresponding to liking of the driver.

Further, in this embodiment, the explanation has been made with respect to the case in which the target torques are set by using the plurality of mode maps having the plurality of driving force characteristics which differ based on the accelerator opening degree and the engine rotational speed. However, the present invention is not limited to such an embodiment and the target torques of the respective driving force characteristics may be obtained by calculation based on the accelerator opening degree and the engine rotational speed.

Further, in this embodiment, although the explanation has been made with respect to the case in which the throttle actuator 37 which drives the throttle valve mounted on the electronic controlled throttle device as a controlling object, the controlling object is not limited to the throttle actuator 37. For example, in a diesel engine, an injector drive device may be set as the controlling object and an injection quantity of fuel to be injected from the injector drive device may be set based on a target torque $\tau e$. Further, in an engine which performs an open/close operation of an intake valve using a solenoid valve mechanism, the solenoid valve mechanism is set as the controlling object and valve opening of the intake valve which is driven by the solenoid valve mechanism may be set based on the target torque $\tau e$.

What is claimed is:

1. A driving force control device of a vehicle comprising:

mode selection control means provided to select one mode out of at least three modes which differ in driving force characteristics as a control mode based on an external manipulation;

temporary changeover mode setting means provided to set an arbitrary mode from the respective modes as a temporary changeover mode based on an external manipulation;

temporary changeover control means for changing over the mode selected by the mode selection control means and the temporary changeover mode set by the temporary changeover mode setting means alternately based on an external manipulation; and driving force setting means for setting a driving force indication value based on a driving state from a driving force characteristic corresponding to the mode selected by the mode selection control means or the temporary changeover mode when temporarily selected by the temporary changeover control means.

2. A driving force control device of the vehicle according to claim 1, wherein the driving force control device further comprises:

a return control means provided to return to the mode selected by the mode selection control means depending on the return conditions when the temporary changeover mode is carried out.

3. A driving force control device of the vehicle according to claim 2, wherein the return control means determines the permission of return based on at least the manipulation of an accelerator of the vehicle by a driver.

4. A driving force control device of the vehicle according to claim 2, wherein the return control means determines the permission of return based on the manipulation of an accelerator by a driver in the closing direction when the temporary changeover mode comprises a mode of higher output than the mode selected by the mode selection control means, and the return control means determines the permission of return based on the manipulation of the accelerator by the driver in the opening direction when the temporary changeover mode comprises a mode of lower output than the mode selected by the mode selection control means.

5. A driving force control device of the vehicle according to claim 2, wherein the return control means forbids the return when a vehicle speed is more than a first threshold value in a state that the temporary changeover mode comprises a mode of higher output than the mode selected by the mode selection control means, and the return control means forbids the return when a vehicle speed is less than a second threshold value in a state that the temporary changeover mode comprises a mode of lower output than the mode selected by the mode selection control means.

6. A driving force control device of the vehicle according to claim 2, wherein the return control means forbids the return when a lapsed time from the start of the temporary changeover mode is shorter than a set time.

7. A driving force control device of the vehicle according to claim 2, wherein the return control means forbids the return when a lateral acceleration acting on the vehicle is larger than a threshold value.

* * * * *

UNITED STATES PATENT AND TRADEMARK OFFICE

CERTIFICATE OF CORRECTION

PATENT NO. : 7,546,197 B2
APPLICATION NO. : 11/783266
DATED : June 9, 2009
INVENTOR(S) : Toshio Masuda et al.

It is certified that error appears in the above-identified patent and that said Letters Patent is hereby corrected as shown below:

Please add the names of the fifth to eighth (5th to 8th) inventors as follows:

Title page Item (75) Inventors: Hiroshi OISHI
Toyohide SUNAGUCHI
Yoshio IWAKAMI
Munenori HOMMA Signed and Sealed this Eighth Day of September, 2009

David J. Kappos

David J. Kappos
*Director of the United States Patent and Trademark Office*